US010267456B2

United States Patent
Reddi et al.

(10) Patent No.: US 10,267,456 B2
(45) Date of Patent: Apr. 23, 2019

(54) TWO-TIER TUBE-TRAILER OPERATION METHOD AND SYSTEM TO REDUCE HYDROGEN REFUELING COST

(71) Applicant: UChicago Argonne, LLC, Chicago, IL (US)

(72) Inventors: Krishna Reddi, Westmont, IL (US); Amgad Elgowainy, Lisle, IL (US)

(73) Assignee: UChicago Argonne, LLC, Chicago, IL (US)

( * ) Notice: Subject to any disclaimer, the term of this patent is extended or adjusted under 35 U.S.C. 154(b) by 209 days.

(21) Appl. No.: 15/272,622

(22) Filed: Sep. 22, 2016

(65) Prior Publication Data

US 2018/0080608 A1    Mar. 22, 2018

(51) Int. Cl.
*F17C 5/06*    (2006.01)
*F17C 13/02*    (2006.01)

(52) U.S. Cl.
CPC .............. *F17C 5/06* (2013.01); *F17C 13/025* (2013.01); *F17C 2221/012* (2013.01); *F17C 2223/035* (2013.01); *F17C 2250/032* (2013.01); *F17C 2250/043* (2013.01); *F17C 2270/0763* (2013.01)

(58) Field of Classification Search
CPC .... F17C 5/06; F17C 13/025; F17C 2221/012; F17C 2223/035; F17C 2250/032; F17C 2250/043; F17C 2270/0763
USPC .......................... 141/3, 4, 11, 18, 20, 95, 231
See application file for complete search history.

(56) References Cited

U.S. PATENT DOCUMENTS

| | | | | |
|---|---|---|---|---|
| 5,409,046 A | * | 4/1995 | Swenson | F17C 9/02 141/11 |
| 5,884,675 A | * | 3/1999 | Krasnov | F17C 5/06 141/18 |
| 7,624,770 B2 | * | 12/2009 | Boyd | F17C 5/007 141/11 |
| 7,921,883 B2 | | 4/2011 | Cohen et al. | |

(Continued)

FOREIGN PATENT DOCUMENTS

| | | |
|---|---|---|
| EP | 1800930 A1 | 6/2007 |
| WO | WO2004005792 A1 | 1/2004 |
| WO | WO2011133296 A1 | 10/2011 |

OTHER PUBLICATIONS

Search Report and written opinion for PCT/US 17/52959 dated Dec. 5, 2017.

*Primary Examiner* — Timothy L Maust
(74) *Attorney, Agent, or Firm* — Joan Pennington

(57) ABSTRACT

A method and system are provided for operating refueling station tube-trailers and compressors to reduce hydrogen refueling cost. A hydrogen refueling station includes a two-tier fuel supply of pressure vessels on a refueling station tube-trailer, with a first tier and a second tier of pressure vessels including at least one or more pressure vessels connected together. A separate control unit is coupled to the first tier and the second tier of pressure vessels with each of the control units coupled to a compressor. The compressor is coupled to a high pressure buffer storage by a separate control unit. In operation, pressure is monitored in the each tier. Hydrogen is consolidated selectively between the first tier of pressure vessel banks, the second tier pressure vessels, and the high pressure buffer. Based upon monitored pressures, one of the first tier of pressure vessels, the second tier pressure vessel banks, and the high pressure buffer is used to refuel vehicles.

20 Claims, 23 Drawing Sheets

(56) References Cited

U.S. PATENT DOCUMENTS

| | | |
|---|---|---|
| 8,752,596 B2 | 6/2014 | Mori et al. |
| 8,831,792 B2 | 9/2014 | Maier et al. |
| 9,739,418 B2 * | 8/2017 | Elgowainy ................ F17C 5/06 |
| 2005/0056661 A1 | 3/2005 | Casamatta et al. |
| 2006/0118575 A1 | 6/2006 | Boyd et al. |
| 2006/0174965 A1 * | 8/2006 | Hobbs ...................... C01B 3/34 141/18 |
| 2006/0180240 A1 * | 8/2006 | Niedzwiechi ............ B60P 3/14 141/231 |
| 2007/0051423 A1 * | 3/2007 | Handa ...................... F17C 5/00 141/94 |
| 2007/0084879 A1 | 4/2007 | McLean et al. |
| 2007/0100503 A1 | 5/2007 | Balan et al. |
| 2009/0151812 A1 * | 6/2009 | Allidieres ............... F17C 5/007 141/11 |
| 2010/0167155 A1 | 7/2010 | Kim et al. |
| 2011/0093305 A1 | 4/2011 | Alexander et al. |
| 2011/0259469 A1 | 10/2011 | Harty et al. |
| 2012/0318403 A1 * | 12/2012 | Cohen ...................... F17C 7/02 141/3 |
| 2013/0180620 A1 * | 7/2013 | Praller ..................... F17C 5/02 141/11 |
| 2015/0020918 A1 * | 1/2015 | Macaluso ................ F17C 5/06 141/11 |
| 2015/0090364 A1 * | 4/2015 | Elgowainy ............... F17C 5/06 141/4 |
| 2015/0176766 A1 * | 6/2015 | Nettis ...................... F17C 5/06 141/4 |

* cited by examiner

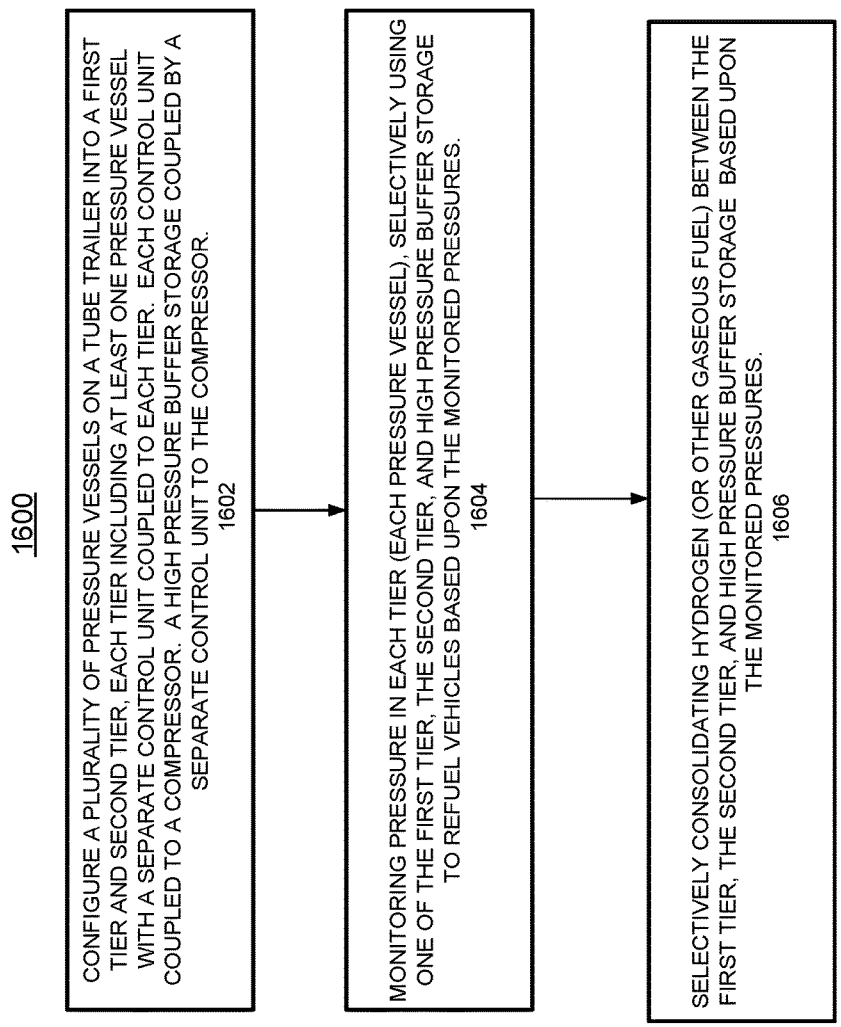

TWO-TIER TUBE-TRAILER OPERATION METHOD AND SYSTEM TO REDUCE HYDROGEN REFUELING COST

CONTRACTUAL ORIGIN OF THE INVENTION

The United States Government has rights in this invention pursuant to Contract No. DE-AC02-06CH11357 between the United States Government and UChicago Argonne, LLC representing Argonne National Laboratory.

FIELD OF THE INVENTION

The present invention relates generally to hydrogen refueling systems, and more particularly, relates to a method and system for operating two-tier refueling station tube-trailers and compressors to reduce hydrogen refueling cost.

DESCRIPTION OF THE RELATED ART

U.S. Patent Publication 2015/0090364 A1 published Apr. 2, 2015 by the present inventors and assigned to the present assignee discloses a method and apparatus for operating a refueling station including source tube-trailers and at least one compressor to reduce refueling cost. The refueling station includes a gaseous fuel supply source including a plurality of tanks on a tube trailer coupled to a first control unit, and high pressure buffer storage having predefined capacity coupled to a second control unit and the first tanks by a pressure control valve and the first control unit, and at least one compressor. The refueling station is operated at different modes depending on a state of the refueling station at the beginning of each operational mode. The refueling system is assessed at the end of each operational mode to identify the state of the system and select a next mode of operation. The operational modes include consolidating hydrogen, or any gaseous fuel, within the tubes mounted on the trailer.

While the above identified U.S. Patent Publication 2015/0090364 A1 provides improvements over the prior art, it is desirable to provide an enhanced method and system for operating refueling station tube-trailers and compressors to reduce refueling cost of hydrogen and other fuels.

It is desirable to provide such enhanced method and system for operating refueling station tube-trailers and compressors that includes a two-tier operation strategy for refueling station tube-trailers, with each tier including at least one pressure vessel bank as a subset of the refueling station tube-trailers.

It is desirable to provide such enhanced method and system for operating refueling station tube-trailers and compressors that maximizes utilization of storage at a refueling site.

It is desirable to provide such enhanced method and system for operating refueling station tube-trailers and compressors that limits the number of pressure vessels subjected to pressure cycling during station operation.

It is desirable to provide such enhanced method and system for operating refueling station tube-trailers and compressors that reduces the number of fittings and simplifies controls, further reducing the refueling costs.

It is desirable to provide such enhanced method and system for operating refueling station tube-trailers and compressors that reduces the risk of pressure cycling of pressure vessels over known arrangements, while providing high tube-trailer payload utilization.

SUMMARY OF THE INVENTION

Principal aspects of the present invention are to provide a method and system for operating refueling station tube-trailers and compressors to reduce hydrogen refueling cost. Other important aspects of the present invention are to provide such method and apparatus substantially without negative effect and that overcome some of the disadvantages of prior art arrangements.

In brief, a method and system are provided for operating refueling station tube-trailers and compressors to reduce hydrogen refueling cost. A hydrogen refueling station includes a two-tier fuel supply of pressure vessels on a refueling station tube-trailer, with a first tier and a second tier of pressure vessels including at least one or more pressure vessels connected together. A separate control unit is coupled to the first tier and the second tier of pressure vessels with each of the control units coupled to a compressor. The compressor is coupled to a high pressure buffer storage by a separate control unit. In operation, pressure is monitored in each tier. Hydrogen is consolidated selectively between the first tier of pressure vessel banks, the second tier pressure vessels, and the high pressure buffer. Based upon a first predefined pressure in the first tier, the first tier is used to refuel vehicles. Responsive to a second predefined pressure in the first tier, hydrogen is consolidated from the second tier pressure vessels. The high pressure buffer storage is used to refuel vehicles with the second tier responsive to the first predefine pressure in the first tier.

In accordance with features of the invention, hydrogen from the second tier of pressure vessels is consolidated into first tier pressure vessel banks when the compressor is idle and high pressure buffer storage is full. This ensures that the first tier pressure vessel banks are always at higher pressure to ensure a high compressor throughput when replenishing the high pressure buffer during the operation of the refueling station.

In accordance with features of the invention, monitoring pressure in each tier includes monitoring pressure in each pressure vessel in each tier separately.

In accordance with features of the invention, the two-tier fuel supply of pressure vessels is configured to limit the number of pressure vessels subjected to pressure cycling during station operation.

In accordance with features of the invention, the two-tier fuel supply of pressure vessels is configured to reduce the number of fittings and simplify controls, further reducing the refueling costs.

In accordance with features of the invention, the compressor and refueling station are used to effectively and efficiently serve a large number of users further reducing the refueling costs.

In accordance with features of the invention, the compressor optionally includes a first stage and a second stage, each capable of independently handling a separate hydrogen or gaseous fuel stream.

BRIEF DESCRIPTION OF THE DRAWINGS

The present invention together with the above and other objects and advantages may best be understood from the following detailed description of the preferred embodiments of the invention illustrated in the drawings, wherein:

FIG. 16 is a flow chart illustrating example steps for operating refueling station tube-trailers and compressors to reduce hydrogen refueling cost in accordance with preferred embodiments.

DETAILED DESCRIPTION OF THE PREFERRED EMBODIMENTS

Figure 1A:
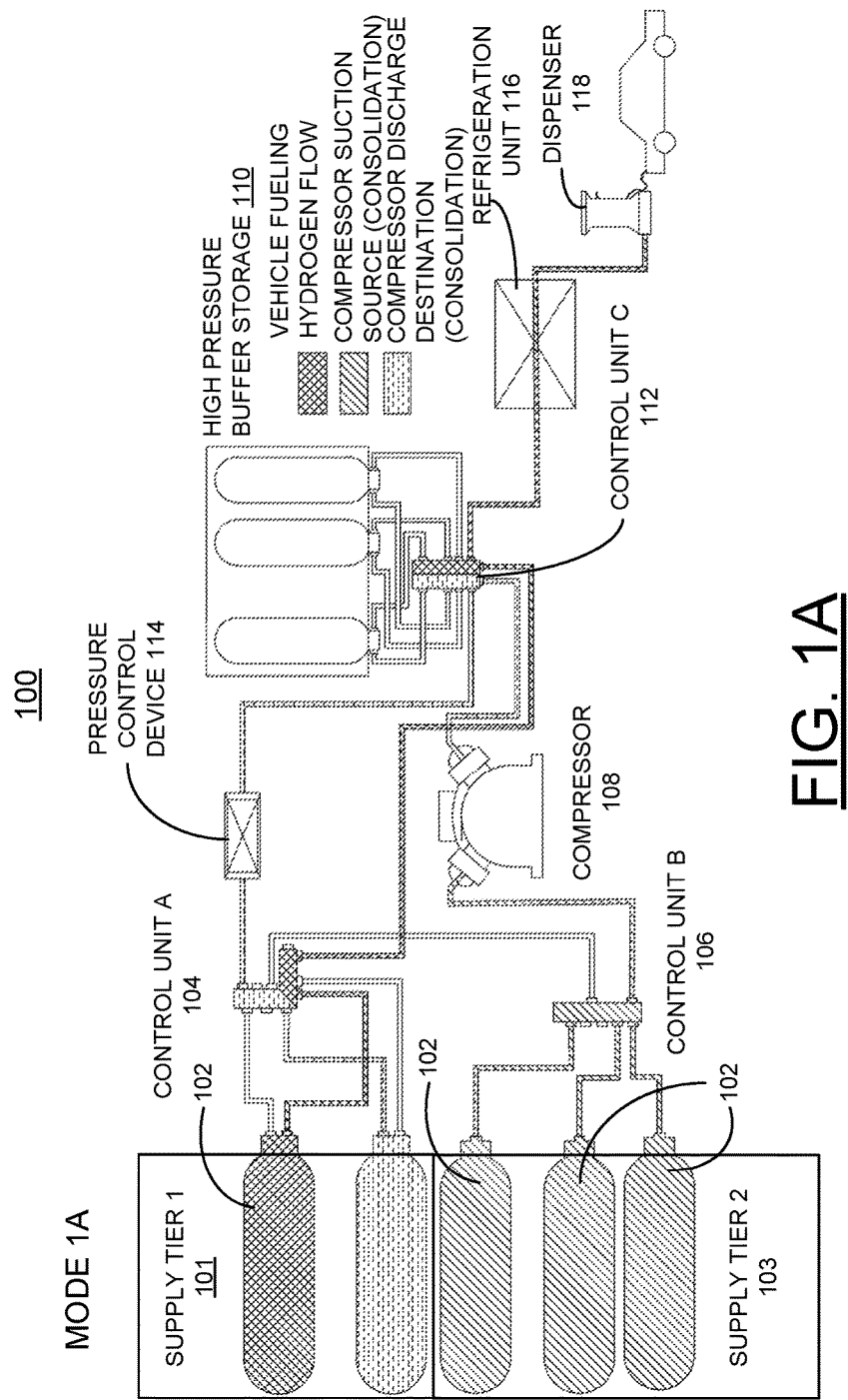
FIGS. 1A, 1B, 2A, 2B, 3, 4, 5A, 5B, 6A, 6B, 7A, 7B, 8, 9, 10, 11A, 11B, 12, 13A, 13B, 14, and 15 schematically illustrate not to scale example refueling station tube-trailer systems for implementing methods for operating refueling station tube-trailers and compressors to reduce hydrogen refueling cost in accordance with a preferred embodiment.

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method and system are provided for operating refueling station tube-trailers and compressors to reduce hydrogen refueling cost. A hydrogen refueling station includes a two-tier fuel supply of pressure vessels on a refueling station tube-trailer, with a first tier and a second tier of pressure vessels including at least one or more pressure vessels connected together. A separate control unit is coupled to the first tier and the second tier of pressure vessels with each of the control units coupled to a compressor. The compressor is coupled to a high pressure buffer storage by a separate control unit. In operation, pressure is monitored in each tier. Hydrogen is consolidated selectively between the first tier of pressure vessel banks, the second tier pressure vessels, and the high pressure buffer. Based upon a first predefined pressure in the first tier, the first tier is used to refuel vehicles. Responsive to a second predefined pressure in the first tier hydrogen is consolidated from the second tier, the high pressure buffer storage is used to refuel vehicles responsive to the second predefined pressure in the first tier.

In accordance with features of the invention, in tier 1, the pressure vessels in a preferred configuration includes at least two banks of pressure vessels that can serve different functions; for example, one bank would initially fill the vehicle, while the other bank of pressure vessels would replenish the high pressure buffer storage. However, in Tier 2 all pressure vessels are aggregated to operate as a single unit.

Having reference now to the drawings, in FIGS. 1A, 1B, 2A, 2B, 3, 4, 5A, 5B, 6A, 6B, 7A, 7B, 8, 9, 10, 11A, 11B, 12, 13A, 13B, 14, and 15, there are schematically shown example fueling station tube-trailer system modes for implementing methods for operating refueling station tube-trailers and compressors to reduce hydrogen refueling cost in accordance with a preferred embodiment.

As shown in FIGS. 1A, 1B, 2A, 2B, 3, 4, 5A, 5B, 6A, 6B, 7A, 7B, 8, 9, 10, 11A, 11B, 12, 13A, 13B, 14, and 15, each illustrated example refueling station tube-trailer systems includes a two-tier fuel supply of pressure vessels on a refueling station tube-trailer, with a first tier 101 of pressure vessels 102 with at least one bank of pressure vessels connected together, and a second tier 103 of pressure vessels 102, each tier 101, 103 including at least one or more pressure vessels 102 respectively connected together. A separate control unit A, B, 104, 106 is coupled to the first tier 101 and the second tier 103 of pressure vessels 102 with each of the control units coupled to a compressor 108. The compressor 108 is coupled to a high pressure buffer storage 110 by a separate control unit C, 112. A pressure control device 114 connects the control unit A, 104 to the control unit C, 112. A refrigeration unit 116 cools the hydrogen to a required temperature coupled between the control unit C, 112 and a dispenser 118 which regulates the hydrogen flow into a vehicle's onboard tank.

In the two-tier operation higher pressure vessel banks 102 on the tube-trailer (at or near operating pressure) initially are used to fill the vehicle tank and supply hydrogen to the compressor 108 until the pressure can no longer sustain a necessary flow required for vehicle fueling. In the two-tier operation higher pressure vessel banks 102, the pressure cycling advantageously is reduced to a minimum or avoided completely. The high pressure buffer 110 is replenished by moving hydrogen from the pressure vessel bank 102 with highest pressure in the first tier 101 of pressure vessels on the tube-trailer. The two-tier operation of pressure vessels 102 on the tube-trailer maximizes the utilization of the compressor 108 and storage at the refueling site, and limits the number of pressure vessels 102 subjected to pressure cycling during the station operation. This two-tier operation reduces the risk of pressure cycling observed in prior art tube-trailer consolidation operations, while ensuring high tube-trailer payload utilization. Also the two-tier operation reduces the number of fittings and simplifies the controls 104, 106, and 112, which would further reduce the refueling cost.

Referring now to FIG. 1A, there is shown an operational mode 1A generally designated by the reference character 100. In Mode 1A, 100, the dispenser 118 is connected to the pressure vessel banks 102 on the tube-trailer for initial vehicle fill. H2 or gaseous fuel is directly drawn from the pressure vessel bank 102 with the highest pressure in Tier 101 (i.e., bypassing compressor 108 and buffer storage 110) to fill the vehicle's tank. The buffer storage 110 is at full capacity. The dispenser 118 is occupied by a vehicle to begin refueling. Mode 1A ends when the mass flow rate between the pressure vessel Tier and the vehicle's tank reaches a predefined lower limit or until the required pressure at the dispenser 118 cannot sustain a necessary flow required for vehicle fueling.

Simultaneously in Mode 1A, 100, an inactive pressure vessel bank 102 with the highest pressure in tier 1, 101 of the tube-trailer is filled (consolidated) from the pressure vessels 102 in the tier 2, 103 through the compressor 108. If the pressure in the destination pressure vessels 102 (tier 1 pressure vessel bank 102) reaches the rated maximum pressure, the next highest pressure vessel bank 102 in tier 1, 101 is selected to be filled from tier 2 (consolidated). This continues until consolidation is complete (i.e., all pressure vessel banks 102 in tier 1, 101, except the one being drawn from, are either at rated maximum pressure or all pressure vessels in Tier 2 are at their specified return pressure).

Figure 1B:
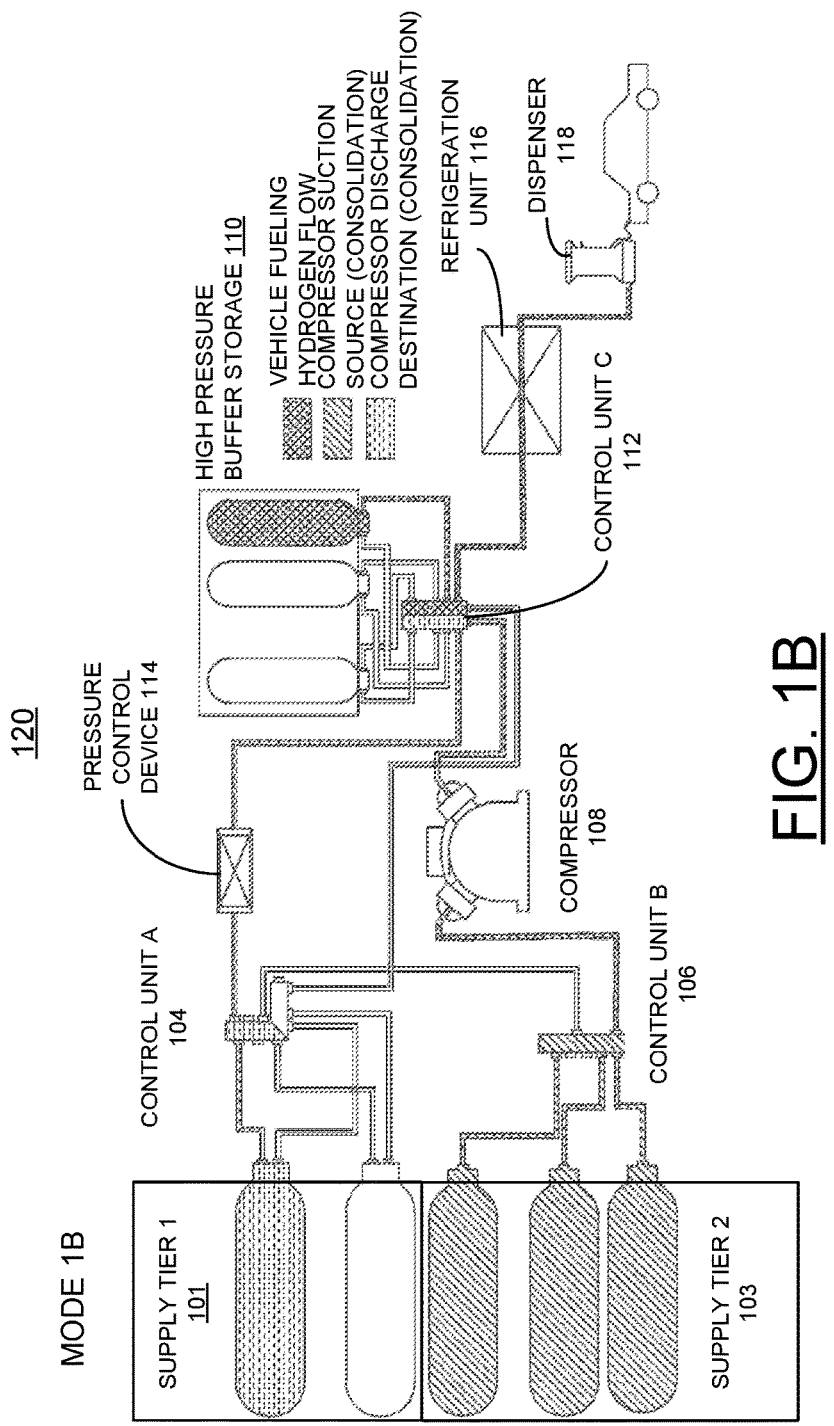

Referring now to FIG. 1B, there is shown an operational mode 1B generally designated by the reference character 120. Mode 1B, 120, immediately follows Mode 1A with the dispenser 118 connected to the buffer storage 110 to fill the vehicle to its maximum possible state of charge.

The H2 or gaseous fuel is drawn from the high pressure buffer storage 110 pressure vessel bank with lowest pressure (above the vehicle tank pressure at that instant) to continue filling the vehicle's tank. This continues until the mass flow rate between the selected high pressure buffer storage's pressure vessel bank and the vehicle's tank reaches a pre-defined lower limit or until the pressure at the dispenser 118 cannot sustain a necessary flow required for vehicle fueling. At this point, the dispenser (or control unit B) switches the source of hydrogen to another high pressure buffer storage's pressure vessel bank with pressure higher than the vehicle's tank. The dispenser keeps switching between the banks of the high pressure buffer source until the vehicle's tank reaches its maximum possible state of charge. Mode 1B ends when the vehicle reaches its maximum possible state of charge.

Simultaneously in Mode 1B, 120, the pressure vessel bank 102 with the highest pressure (below the rated maximum pressure) in tier 1, 101 of the tube-trailer is filled (consolidated) from pressure vessels 102 in tier 2 through the compressor 108. If the pressure in the destination pressure vessel 102 (tier 1, 101 pressure vessel bank 102) reaches the rated maximum pressure, the next highest pressure vessel bank 102 in tier 1, 101 is selected to be filled from tier 2, 103 (consolidated). This continues until there is a change of state or until consolidation is complete (i.e., all pressure vessel banks 102 in tier 1, 101 except the one being drawn from, are either at rated maximum pressure or all pressure vessels 102 in tier 2, 103 are at their specified return pressure).

Figure 2A:
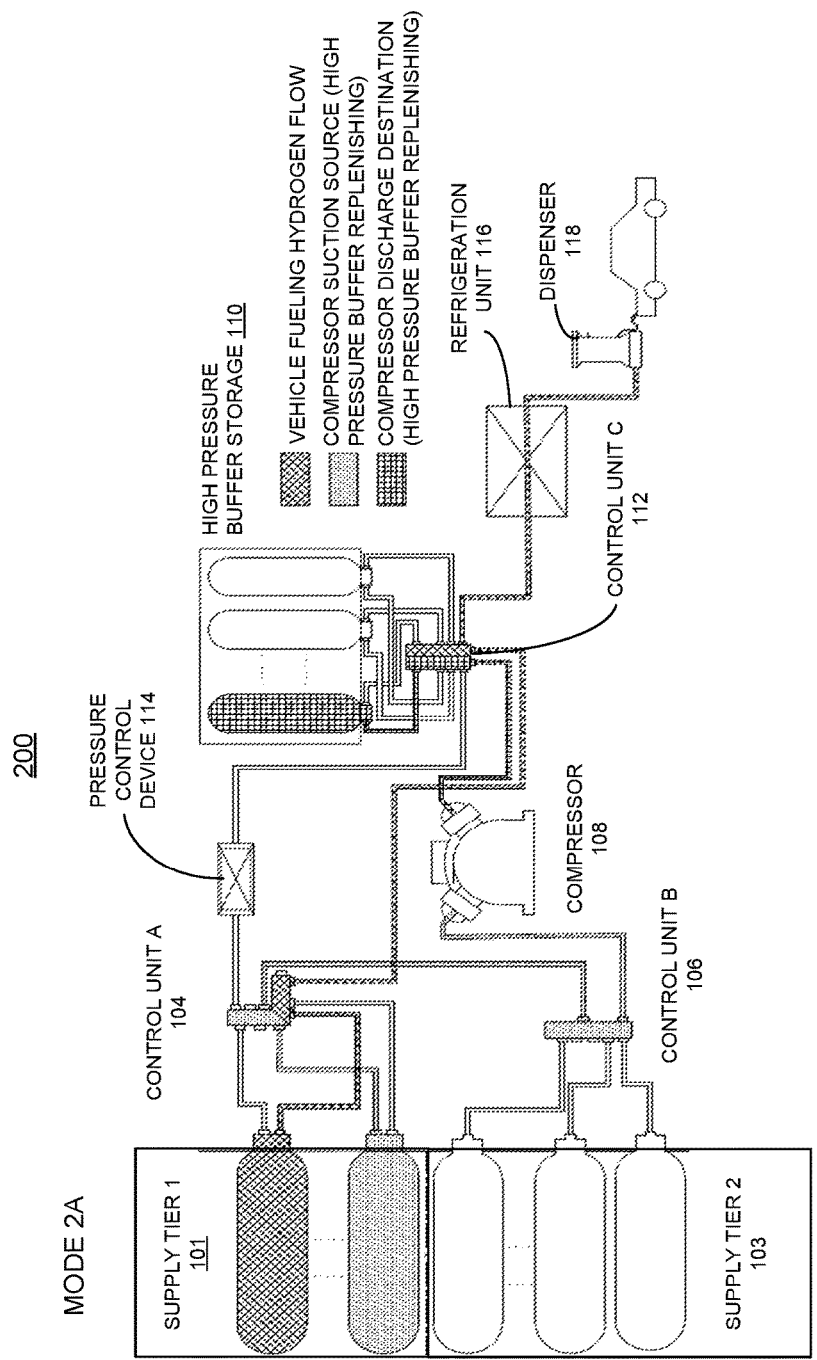
Figure 2B:
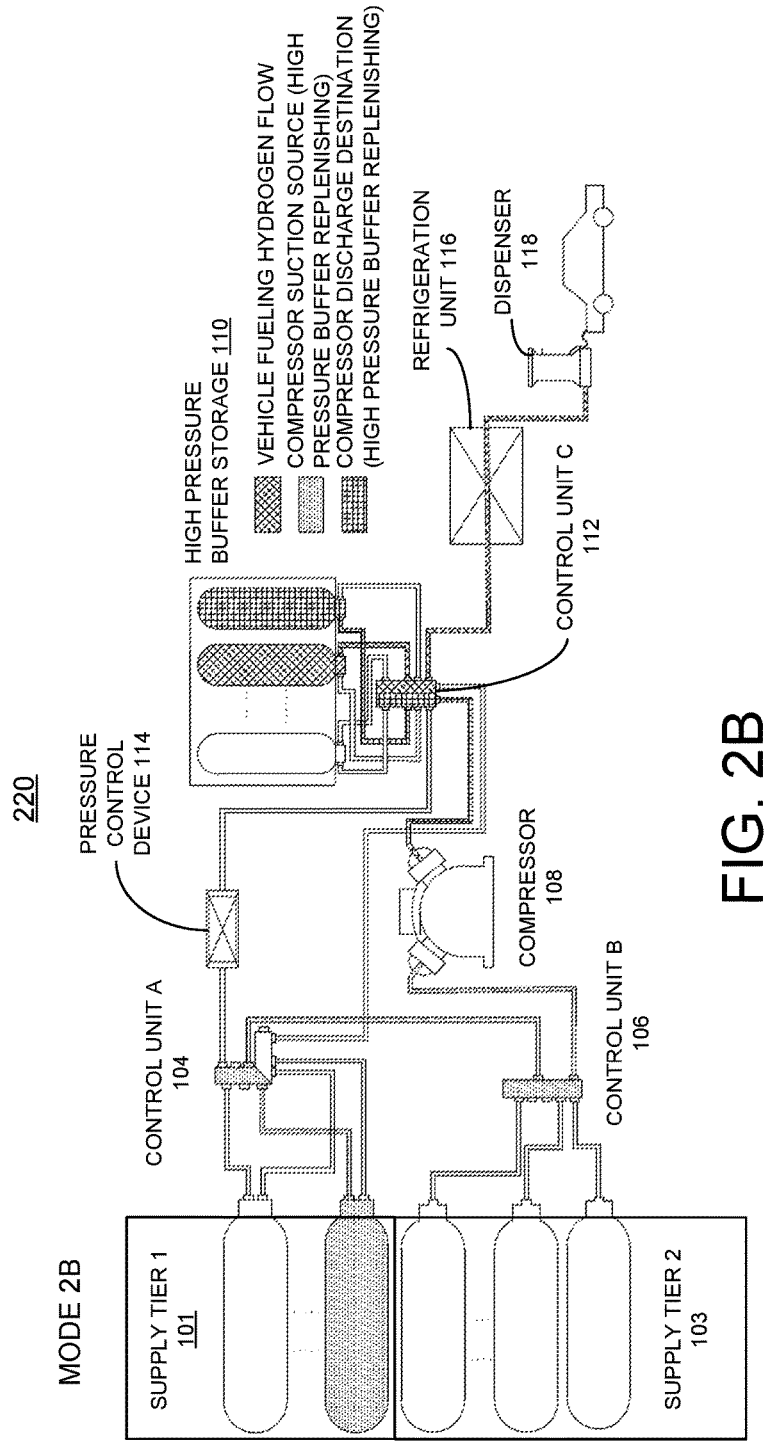

Referring to FIGS. 2A, and 2B, there are shown respective operational modes 2A, 2B generally designated by the respective reference character 200, 220, when the high pressure buffer storage 110 is not at full capacity and a vehicle is refueling at the dispenser 118. The operational mode 2A, 200, and mode 2B, 220 occurs often during peak periods (with consecutive fills).

In Mode 2A, 200 shown in FIG. 2A, dispenser 118 is connected to a tier 1, 101 tube-trailer pressure vessel bank 102 for initial vehicle fill. H2 or gaseous fuel is directly drawn from the pressure vessel bank 102 with the highest pressure in Tier 1, 101 (i.e., bypassing compressor 108 and buffer storage 110) to fill the vehicle's tank. Mode 2A, 200 ends when the mass flow rate between the pressure vessel bank 102 and the vehicle's tank reaches a predefined lower limit or until the pressure at the dispenser 118 cannot sustain a necessary flow required for vehicle fueling.

In Mode 2A, 200 simultaneously, an inactive pressure vessel bank of high pressure buffer storage 110 with the highest pressure is filled from the inactive pressure vessel bank 102 in tier 1, 101 of the tube-trailer, with the highest pressure, through the compressor 108. Once the high pressure buffer storage 110 pressure vessel bank reaches its rated maximum pressure, the compressor 108 discharge switches to fill the next pressure vessel bank of high pressure buffer storage 110 with highest pressure (below rated maximum pressure). This continues until all pressure vessel banks of the high pressure buffer storage 110 reach their rated maximum pressure or until tier 1, 101 pressure vessel banks 102 are at their minimum specified operating pressure.

In FIG. 2B with Mode 2B, 220 the dispenser 118 is connected to the high pressure buffer storage 110 to fill the vehicle to its maximum possible state of charge. The H2 or gaseous fuel is drawn from the high pressure buffer storage pressure 110 vessel bank with lowest pressure (above the vehicle tank pressure at that instant) to continue filling the vehicle's tank. This continues until the mass flow rate between the selected high pressure buffer storage's pressure vessel bank and the vehicle's tank reaches a predefined lower limit or until pressure at the dispenser 118 cannot sustain a necessary flow required for vehicle fueling At this point, the dispenser 118 (or control unit C, 112) switches the source of hydrogen to another pressure vessel bank of high pressure buffer storage 110 with pressure higher than the vehicle's tank. The dispenser 118 keeps switching between the banks of the high pressure buffer source 110 until the vehicle's tank reaches its maximum possible state of charge. Mode 2B, 220 ends when the vehicle reaches its maximum possible state of charge.

In Mode 2B, 220 simultaneously, an inactive pressure vessel bank of high pressure buffer storage 110 with the highest pressure is filled from the inactive pressure vessels 102 in tier 2, 103 of the tube-trailer, with the highest pressure, through the compressor 108. Once the high pressure buffer storage 110 pressure vessel bank reaches its rated maximum pressure, the compressor 108 discharge switches to fill the next high pressure buffer storage's pressure vessel bank with highest pressure (below rated maximum pressure). This continues until all the high pressure buffer storage pressure 110 vessel banks reach their rated maximum pressure or until tier 1, 101 pressure vessel banks 102 are at their minimum specified operating pressure.

Figure 3:
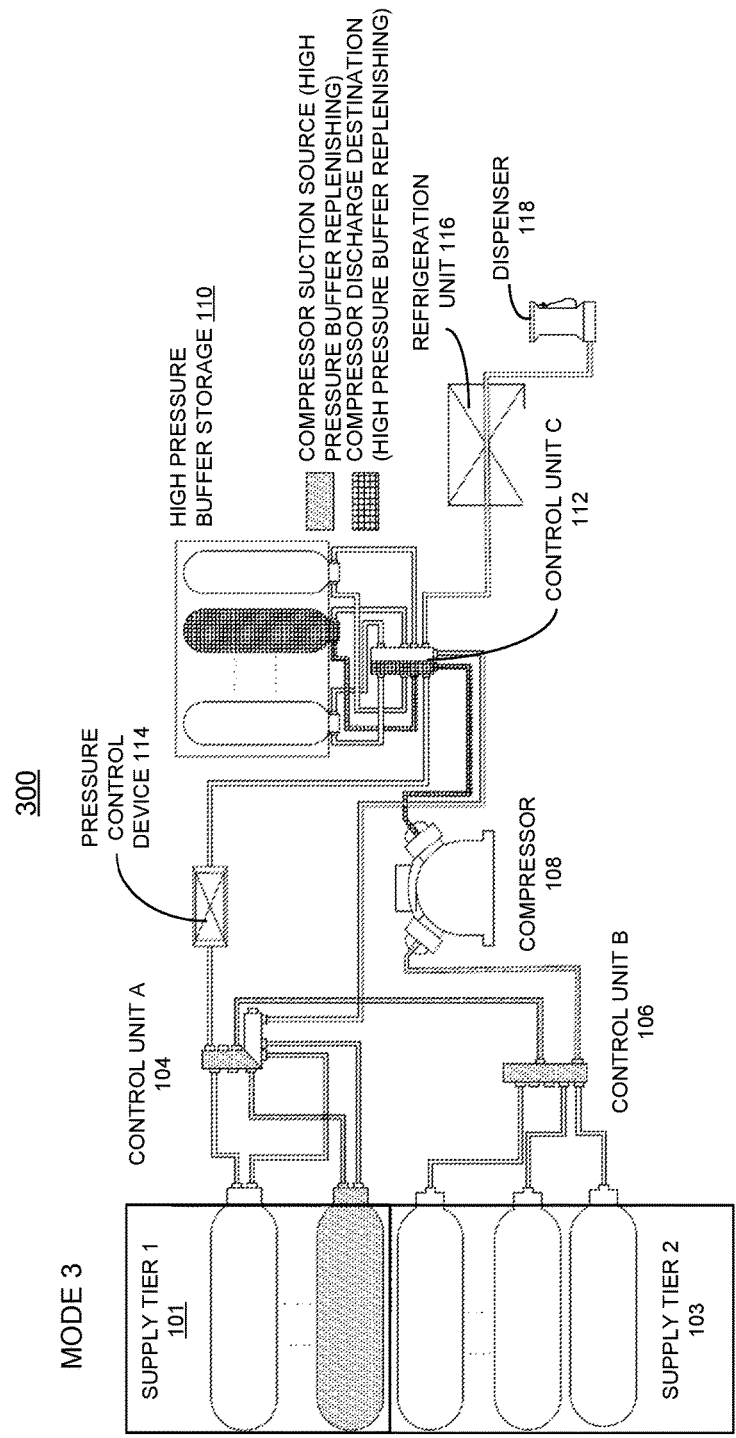

Referring to FIG. 3, there is shown an operational Mode 3 generally designated by the reference character 300. In Mode 3, 300, the dispenser 118 is not occupied and the buffer storage 110 is not at full capacity. The vessel bank of high pressure buffer storage 110 with the highest pressure is filled from the inactive pressure vessel bank 120 in tier 1, 101 of the tube-trailer, with the highest pressure, through the compressor 108. Once this high pressure buffer storage pressure vessel bank reaches its rated maximum pressure, the compressor discharge switches to fill the next vessel bank of the high pressure buffer storage 110 with highest pressure (below rated maximum pressure). This continues until all the high pressure buffer storage pressure vessel banks reach their rated maximum pressure or until tier 1, 101 pressure vessel banks 102 are at their minimum specified operating pressure.

Figure 4:
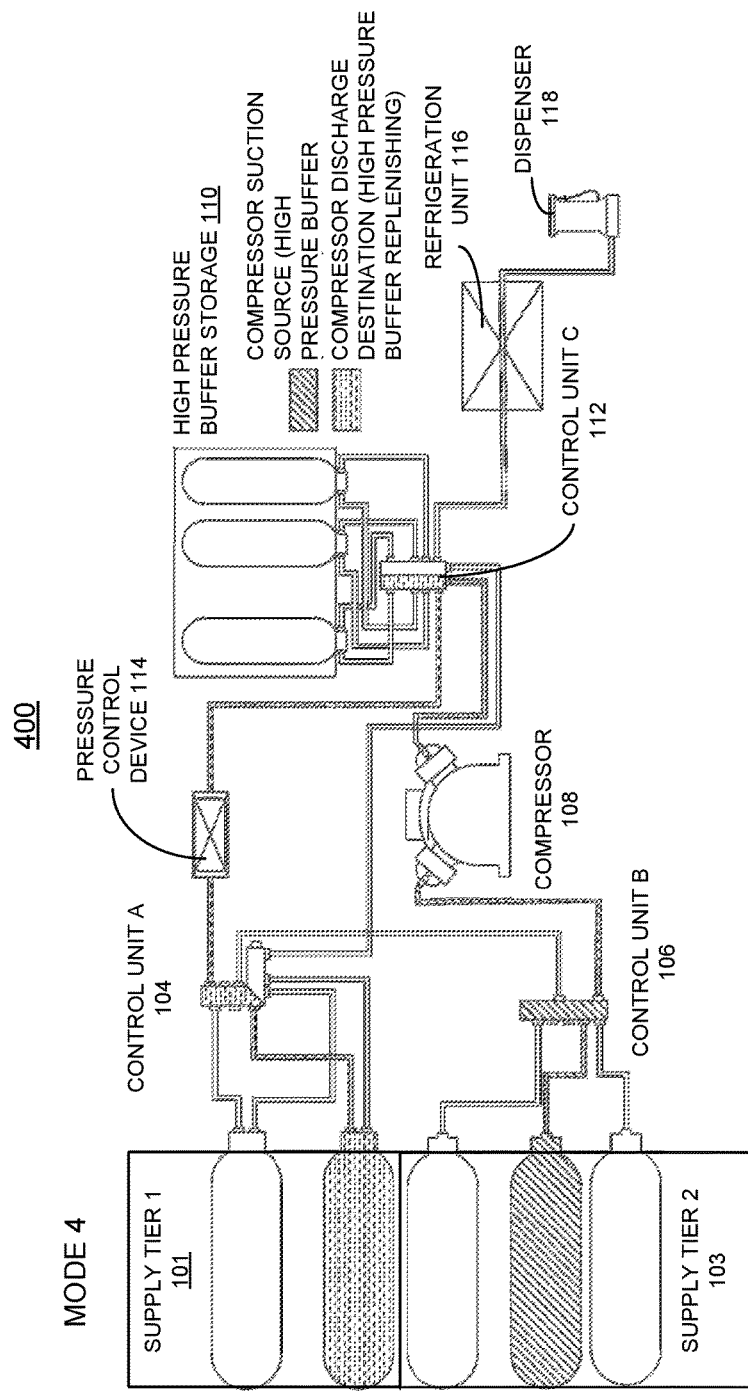

Referring to FIG. 4, there is shown an operational Mode 4 generally designated by the reference character 400. In Mode 4, 400, the dispenser 118 is not occupied and the buffer storage 110 is at full capacity. The inactive pressure vessel bank 102 with the highest pressure in tier 1, 101 of the tube-trailer is filled (consolidated) from pressure vessels 102 in the tier 2, 103 through the compressor 108. When the pressure in the destination pressure vessels 102 (tier 1, 101 pressure vessel bank 102) reaches the rated maximum pressure, the next highest pressure vessel bank 102 in tier 1, 101 is selected to be filled from tier 2, 103 (consolidated). This continues until consolidation is complete (i.e., all pressure vessel banks 102 in tier 1, 101 are either at rated maximum pressure or all pressure vessels 102 in tier 2, 103 are at their specified return pressure).

Referring to FIGS. 5A, 5B, 6A, 6B, 7A, 7B, 8, 9, and 10, there are shown operational modes with vehicle filling via high pressure buffer storage 110, with compressor 108 that has two stages: stage 1, 502, and stage 2, 504, each capable of independently handling a separate stream (Modes 5A, 5B, 6A, 6B, 7A, 7B, 8, 9 and 10).

In FIGS. 5A, 5B, 6A, 6B, 7A, 7B, 8, 9, and 10, when the two stages, stage 1, 502, and stage 2, 504, of a multi-stage compressor 108 are configured to work independently (i.e., each stage can independently handle a separate stream) similar to the operation of two separate single-stage compressors, the operation of the refueling station can be represented in Modes 5A, 5B, 6A, 6B, 7A, 7B, 8, 9 and 10. In arrangement, one stage 1, 502 of the compressor can be dedicated to consolidation moving the hydrogen from tier 2, 103 pressure vessels to tier 1, 101 pressure vessel banks; while simultaneously the other stage 2, 504 of the compressor can be dedicated to replenishing the high pressure buffer storage 110 by moving hydrogen from tier 1, 101 pressure vessel banks 102 to the high pressure buffer storage 110. During each of these modes the following tasks 1 (Vehicle fueling), 2 (Replenishing High Pressure Buffer Storage) and 3 (Tube-Trailer Consolidation) are carried out whenever and wherever possible.

If high pressure buffer storage 110 is full and tube-trailer consolidation from tier 2, 103 into tier 1, 101 is possible, task 2 (Replenishing High Pressure Buffer Storage) is not carried out. In such case, the compressor's stage 2, 504 is effectively idle (for example, by cycling hydrogen in a closed loop with no effect), while the stage 1, 502 of the compressor consolidates from tier 2, 103 into tier 1, 101 of the tube-trailer. Similarly, if high pressure buffer storage 110 is not full and the tube-trailer cannot be consolidated (i.e., all pressure vessel banks 102 in tier 1, 101, except the one being drawn from, are either at rated maximum pressure or all pressure vessels 102 in tier 2, 103 are at their specified return pressure), the compressor's stage 1, 502 is effectively idle, while stage 2, 504 of the compressor replenishes the high pressure buffer storage 110.

Task 1 (Vehicle Fueling):

(a) H2 or gaseous fuel is directly drawn from the pressure vessel bank 102 with the highest pressure in tier 1, 101 (i.e., bypassing compressor and buffer storage 110) to fill the vehicle's tank. This sub-task ends when the mass flow rate between the pressure vessel bank 102 and the vehicle's tank reaches a predefined lower limit or until the pressure at the dispenser 118 cannot sustain a necessary flow required for vehicle fueling.

(b) The H2 or gaseous fuel is drawn from the high pressure buffer storage 110 pressure vessel bank with lowest pressure (above the vehicle tank pressure at that instant) to continue filling the vehicle's tank. This continues until the mass flow rate between the selected high pressure buffer storage's pressure vessel bank and the vehicle's tank reaches a predefined lower limit or until the pressure at the dispenser 118 cannot sustain a necessary flow required for vehicle fueling. At this point, the dispenser 110 (or control unit C, 112) switches the source of hydrogen to another high pressure buffer storage's pressure vessel bank with pressure higher than the vehicle's tank. The dispenser 118 keeps switching between the banks of the high pressure buffer storage 110 until the vehicle's tank reaches its maximum possible state of charge. This task ends when the vehicle reaches its maximum possible state of charge.

Task 2 (Replenishing High Pressure Buffer Storage):

(a) The inactive high pressure buffer storage vessel bank with the highest pressure is filled from the inactive pressure vessel bank 102 in tier 1, 101 of the tube-trailer, with the highest pressure, through the compressor's stage 2, 504. Once the high pressure buffer storage pressure vessel bank reaches its rated maximum pressure, the discharge from the compressor's second stage switches to fill the next high pressure buffer storage's pressure vessel bank with highest pressure (below rated maximum pressure). This continues until all the high pressure buffer storage pressure vessel banks reach their rated maximum pressure, or until tier 1, 101 pressure vessel banks 102 are at their minimum specified operating pressure, or until there is a change of state.

(b) Tier 2, 103 pressure vessels 102 are at their minimum specified operating pressure. The inactive high pressure buffer storage 110 vessel bank with the highest pressure is filled from the inactive pressure vessel bank 102 in tier 1, 101 of the tube-trailer, with the highest pressure, through a combined operation of the two compressor stages 1-2, 502, 504 (in which the compressor's stage 1, 502 draws from tier 1, 101 and feeds into the compressor's stage 2, 504). Once the high pressure buffer storage 110 pressure vessel bank reaches its rated maximum pressure, the discharge from the compressor's second stage 2, 504 switches to fill the next high pressure buffer storage's pressure vessel bank with highest pressure (below rated maximum pressure). This continues until all the pressure vessel banks of the high pressure buffer storage 110 reach their rated maximum pressure, or until tier 1, 101 pressure vessel banks 102 are at their minimum specified operating pressure, or until there is change of state.

Task 3 (Tube-Trailer Consolidation):

The inactive pressure vessel bank with the highest pressure in tier 1 of the tube-trailer is filled (consolidated) from the pressure vessels in the tier 2 through stage 1 of the compressor. If the pressure in the destination pressure vessel bank (tier 1 pressure vessel bank) reaches the rated maximum pressure, the next highest pressure vessel bank in tier 1 is selected to be filled from tier 2 (consolidated). This continues until consolidation is complete (i.e., all pressure vessel banks in Tier 1, except the one being drawn from, are either at rated maximum pressure or all pressure vessels in Tier 2, are at their specified return pressure), or until there is a change of state.

Figure 5A:
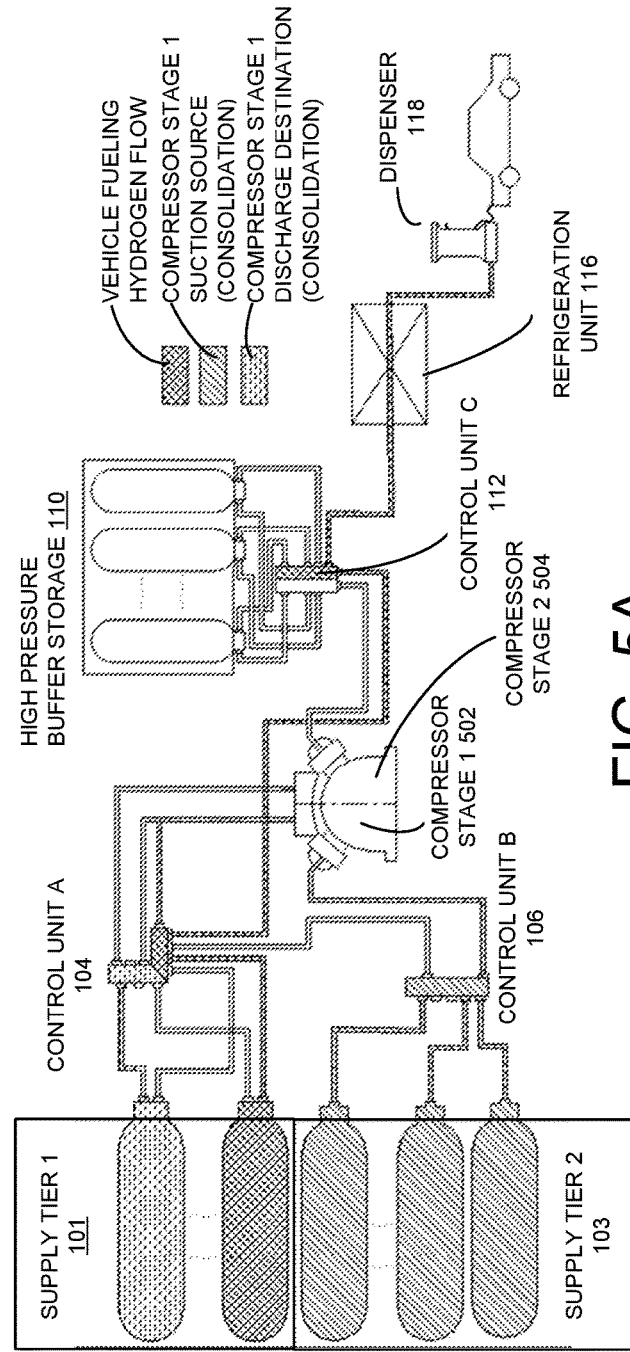
Figure 5B:
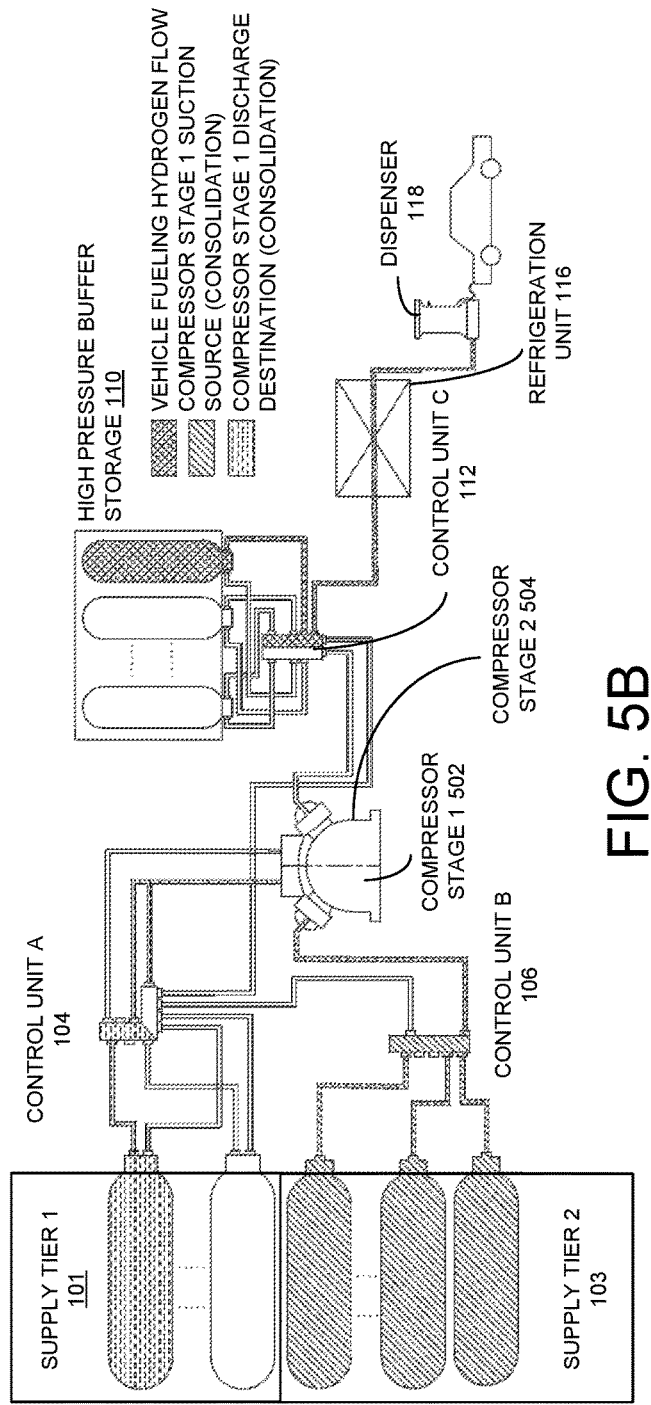

Referring to FIGS. 5A, and 5B, there are shown respective operational modes 5A, 5B generally designated by the reference character 500, 520. Operational modes 5A, 500, and 5B, 520 are similar to Modes 1A, 100, and 1B, 120 with compressor 108 that having two stages 1-2 502, 504, each capable of independently handling a separate stream; Complete Task 1 (a) and Task 3, followed by Task 1 (b) and Task 3.

Figure 6A:
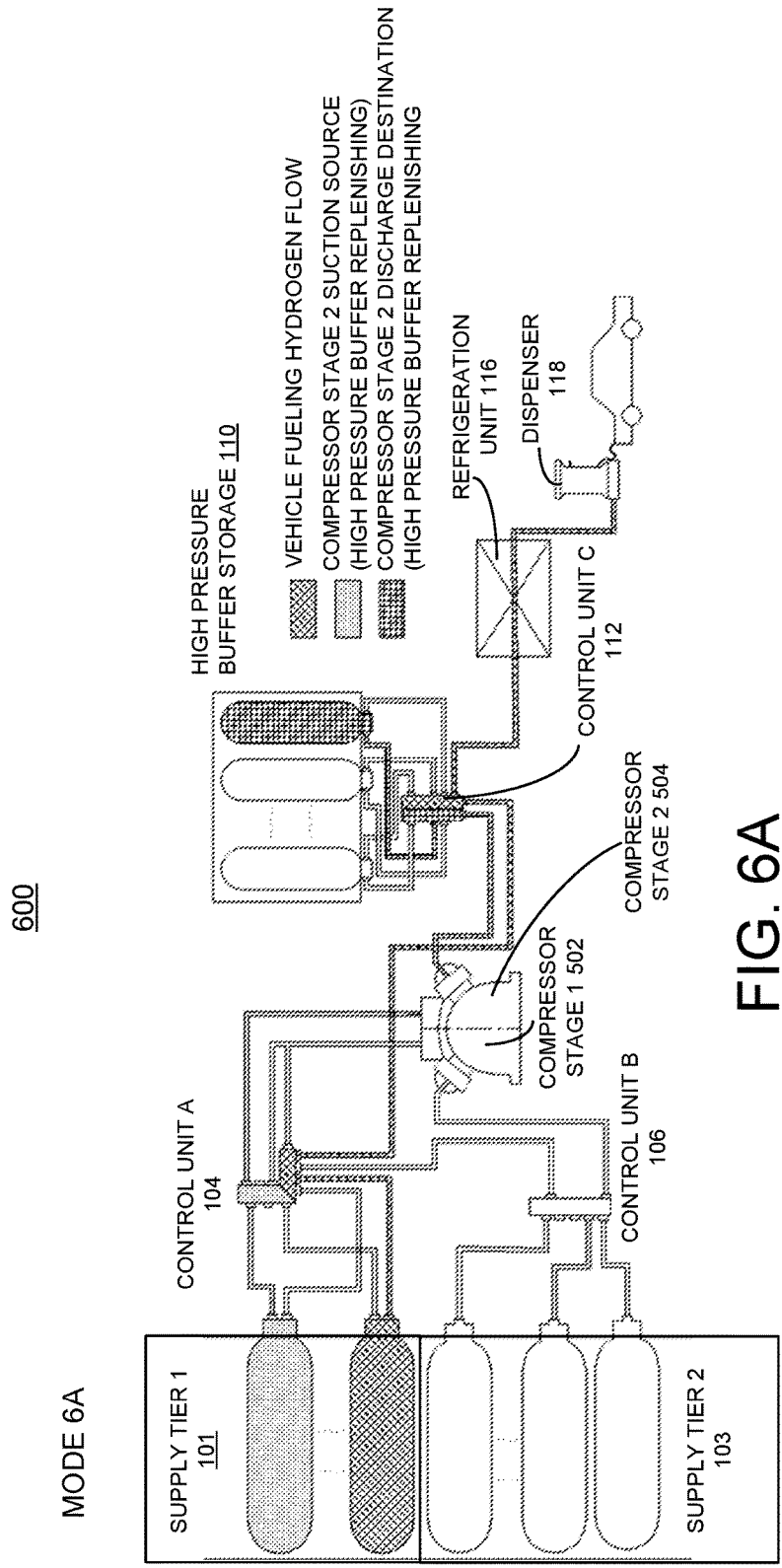
Figure 6B:
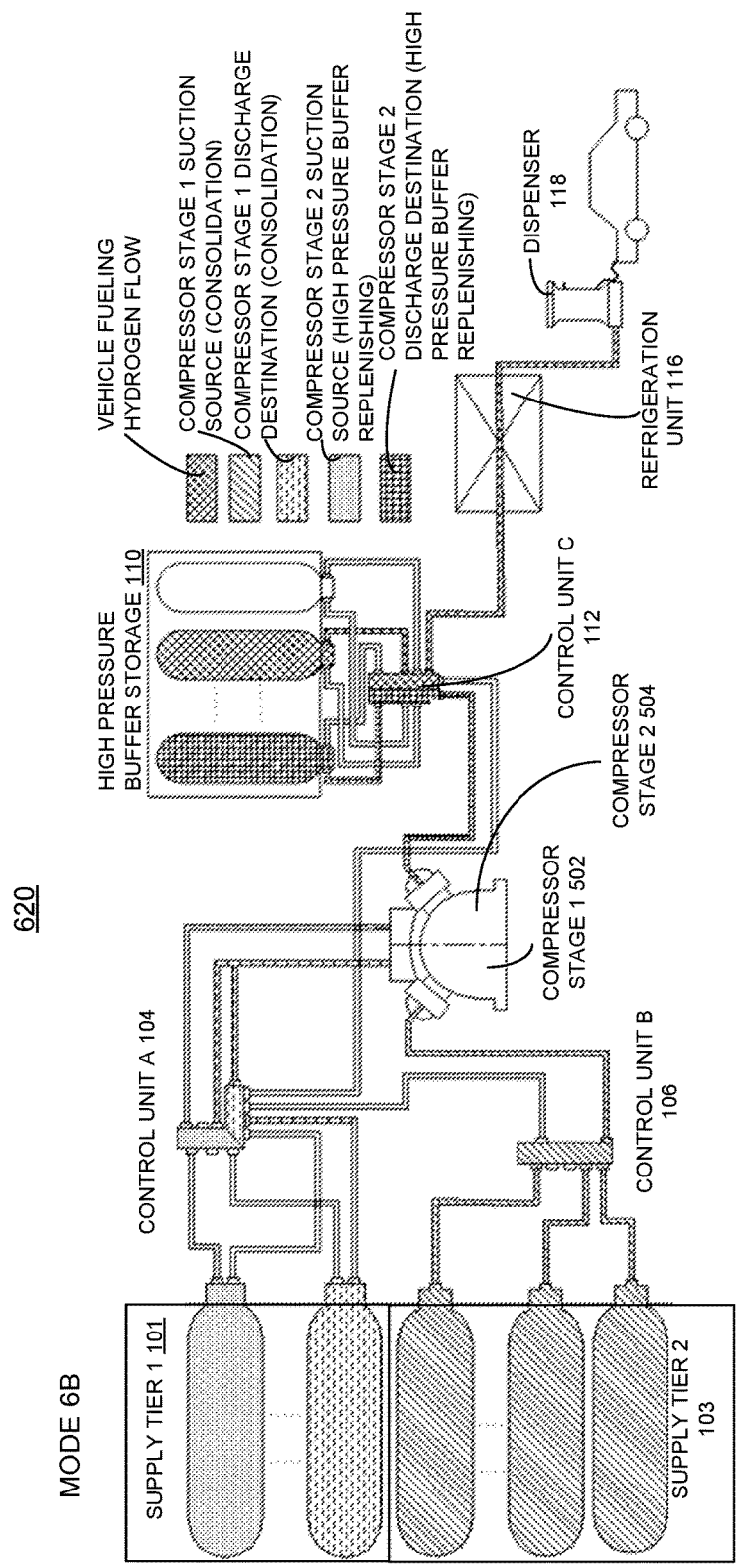

Referring to FIGS. 6A, and 6B, there are shown respective operational modes 6A, 6B generally designated by the reference character 600, 620. Operational modes 6A, 600, and 6B, 620 are similar to Modes 2A, 200, and 2B, 220 with compressor 108 that having two stages 1-2 502, 504, each capable of independently handling a separate stream; Complete Task 1 (a) and Task 2 (a), followed by Task 1 (b), Task 2 (b), and Task 3.

Figure 7A:
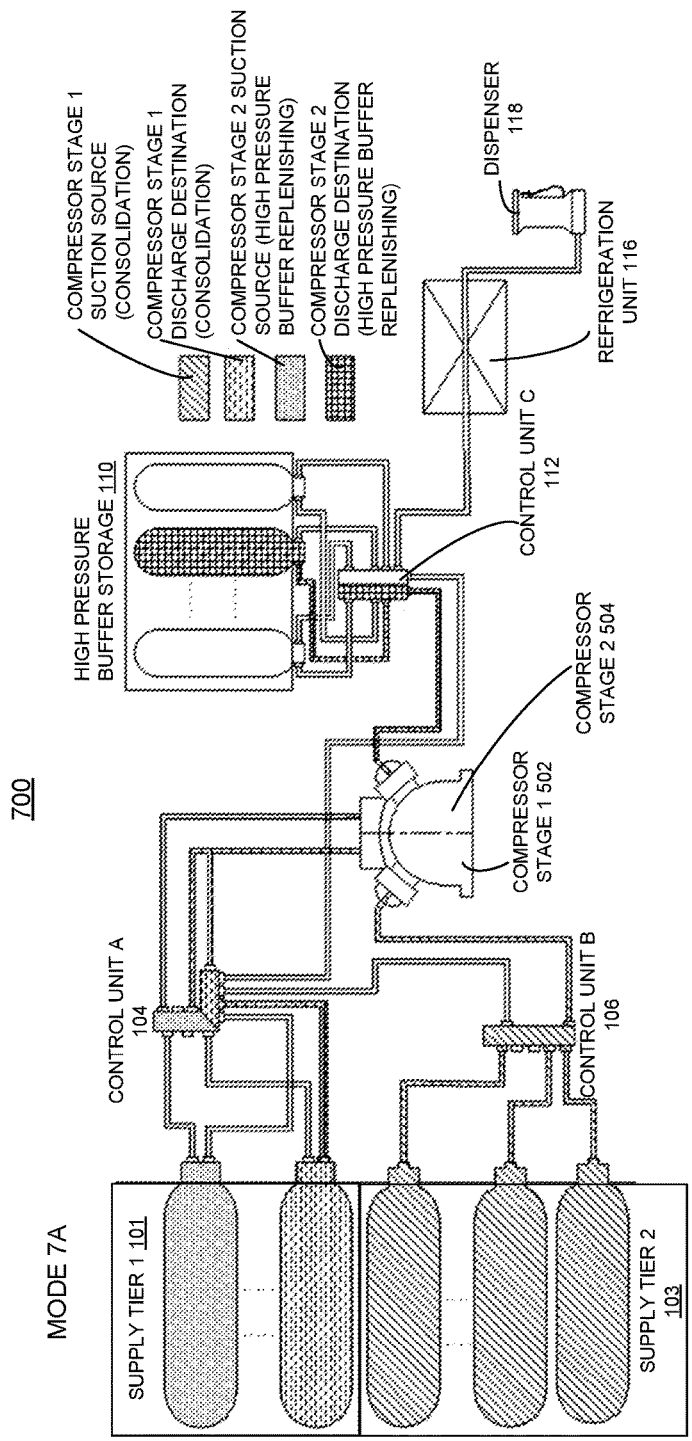
Figure 7B:
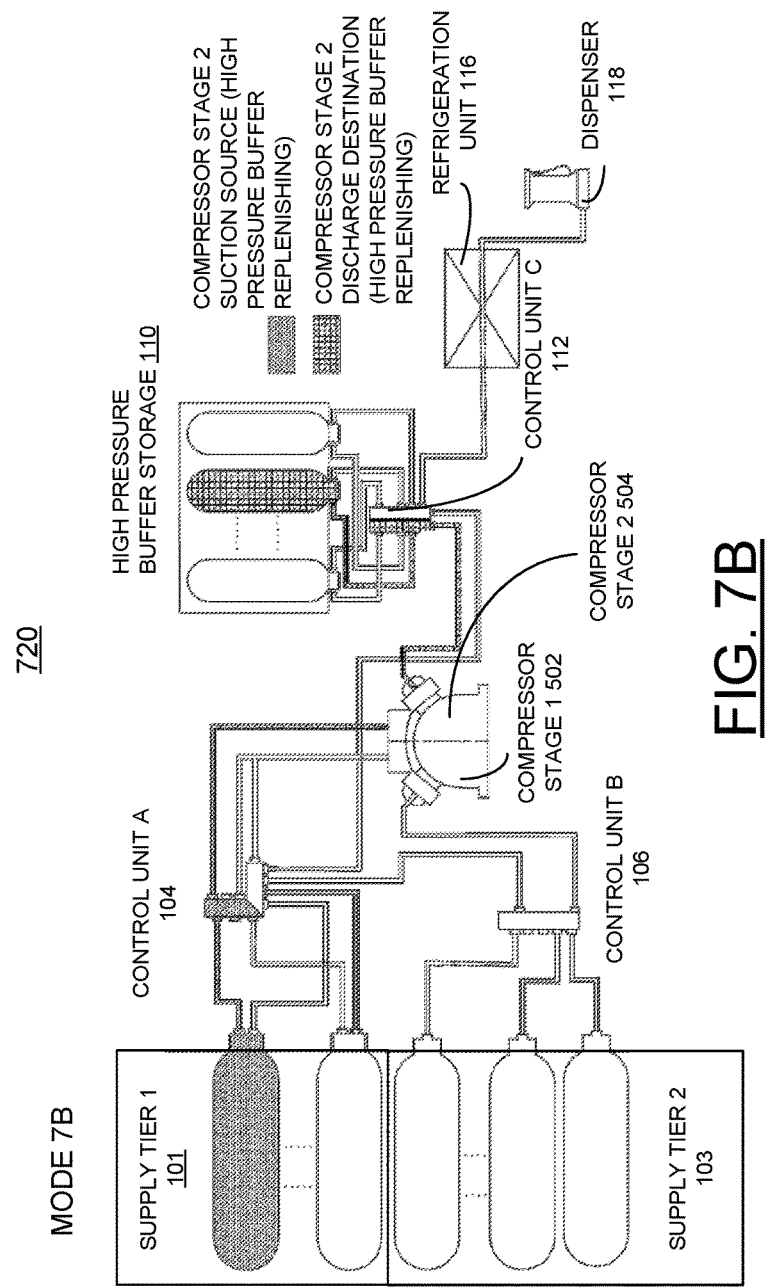

Referring to FIGS. 7A, and 7B, there are shown respective operational modes 7A, 7B generally designated by the reference character 700, 720. Operational modes 7A, 700, and 7B, 720 are similar to Mode 3, 300 with compressor 108 that having two stages 1-2 502, 504, each capable of independently handling a separate stream; Complete Task 2 (a) and Task 3.

Figure 8:
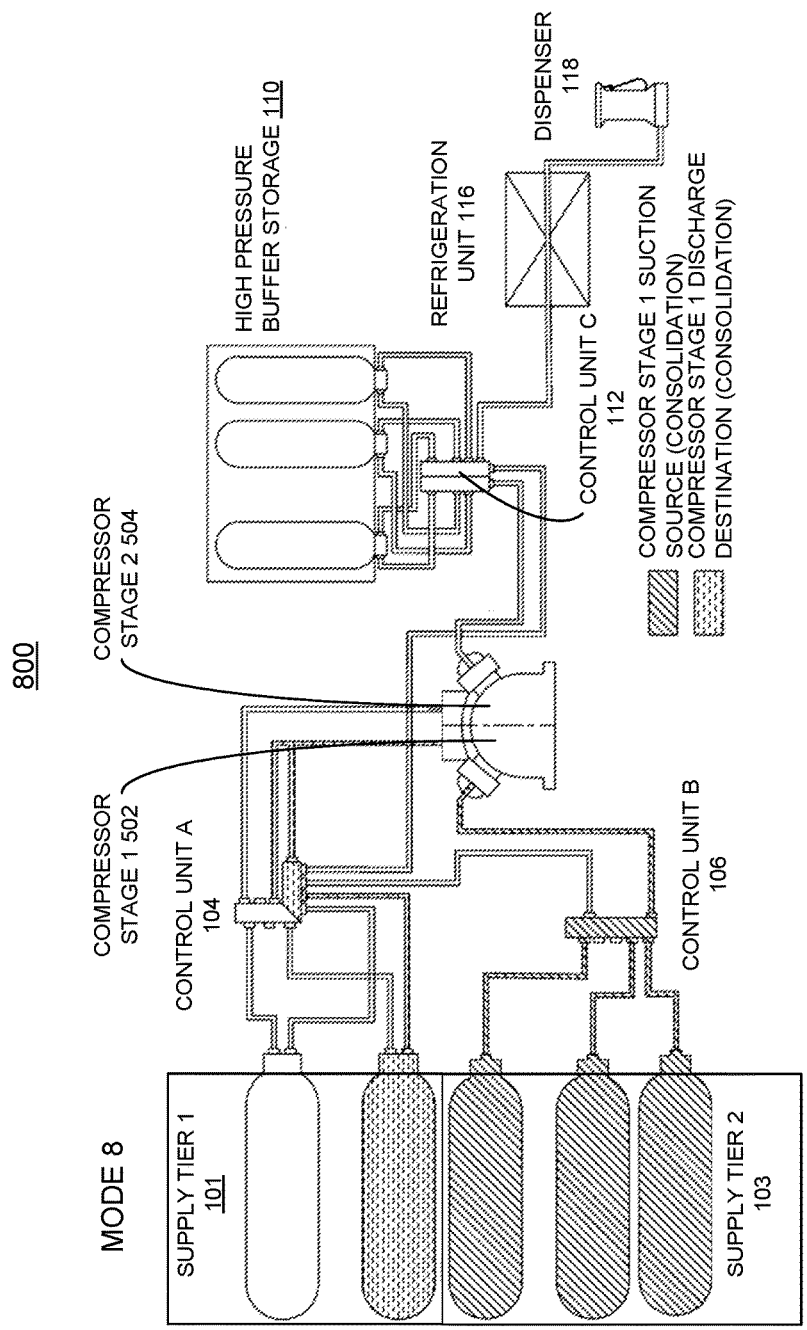

Referring to FIG. 8, there is shown an operational mode 8 generally designated by the reference character 800. Operational mode 8, 800 is similar to Mode 4, 400 with compressor 108 that having two stages 1-2 502, 504, each capable of independently handling a separate stream; Complete Task 3.

Figure 9:
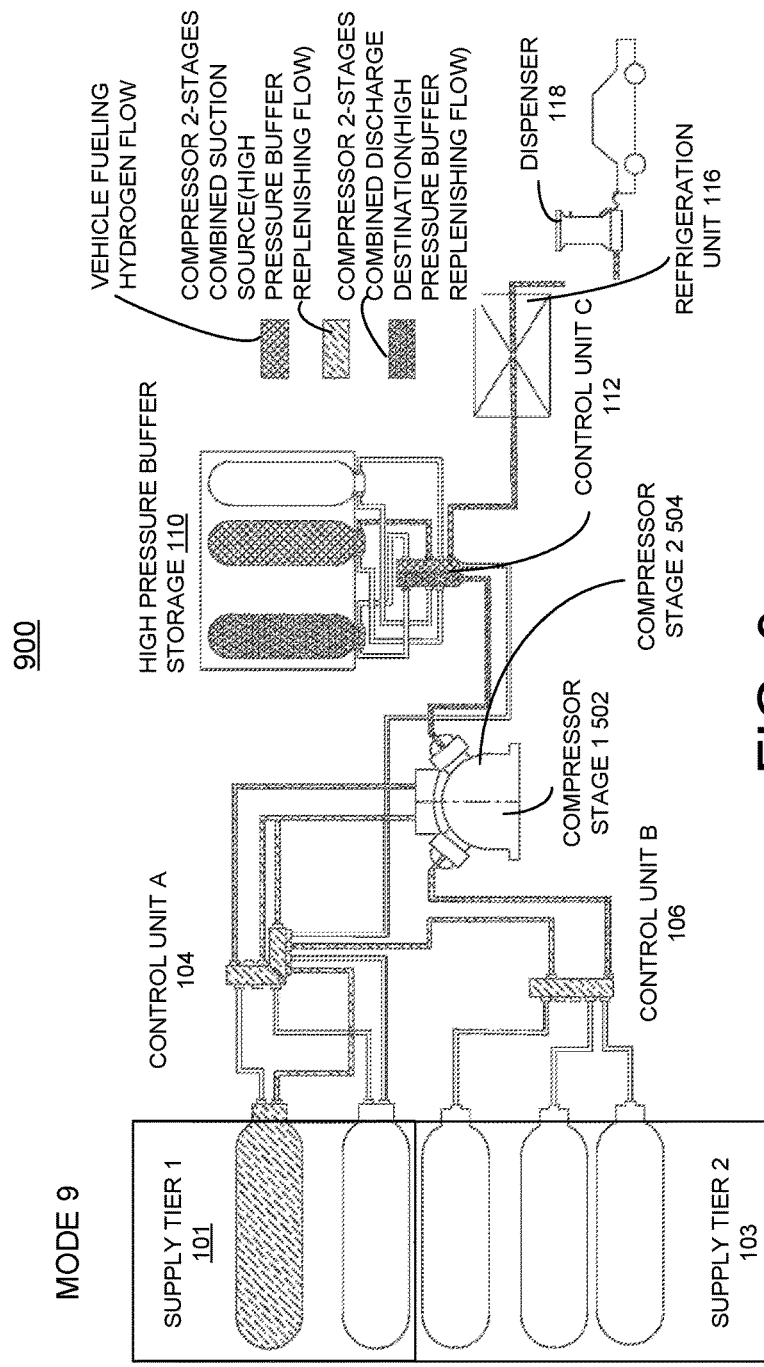

Referring to FIG. 9, there is shown an operational mode 9 generally designated by the reference character 900. Operational mode 9, 900 is similar to Modes 2A, 200, and 2B, 220 with compressor 108 that having two stages 1-2 502, 504, each capable of independently handling a separate stream; Complete Task 1 (b) and Task 2 (b).

Figure 10:
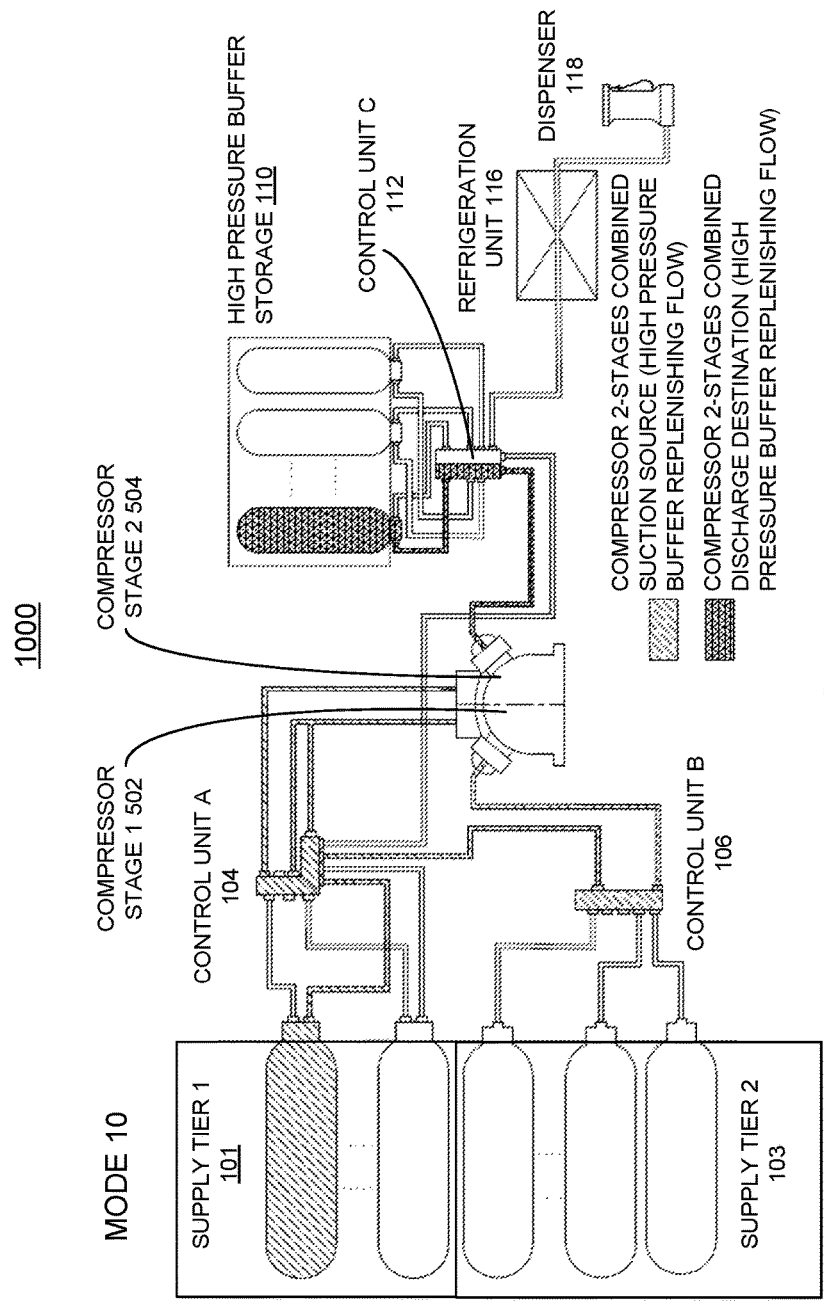

Referring to FIG. 10, there is shown an operational mode 10 generally designated by the reference character 1000. Operational mode 10, 1000 is similar to Mode 3, 300 with compressor 108 that having two stages 1-2 502, 504, each capable of independently handling a separate stream; Complete Task 2(b).

Figure 11A:
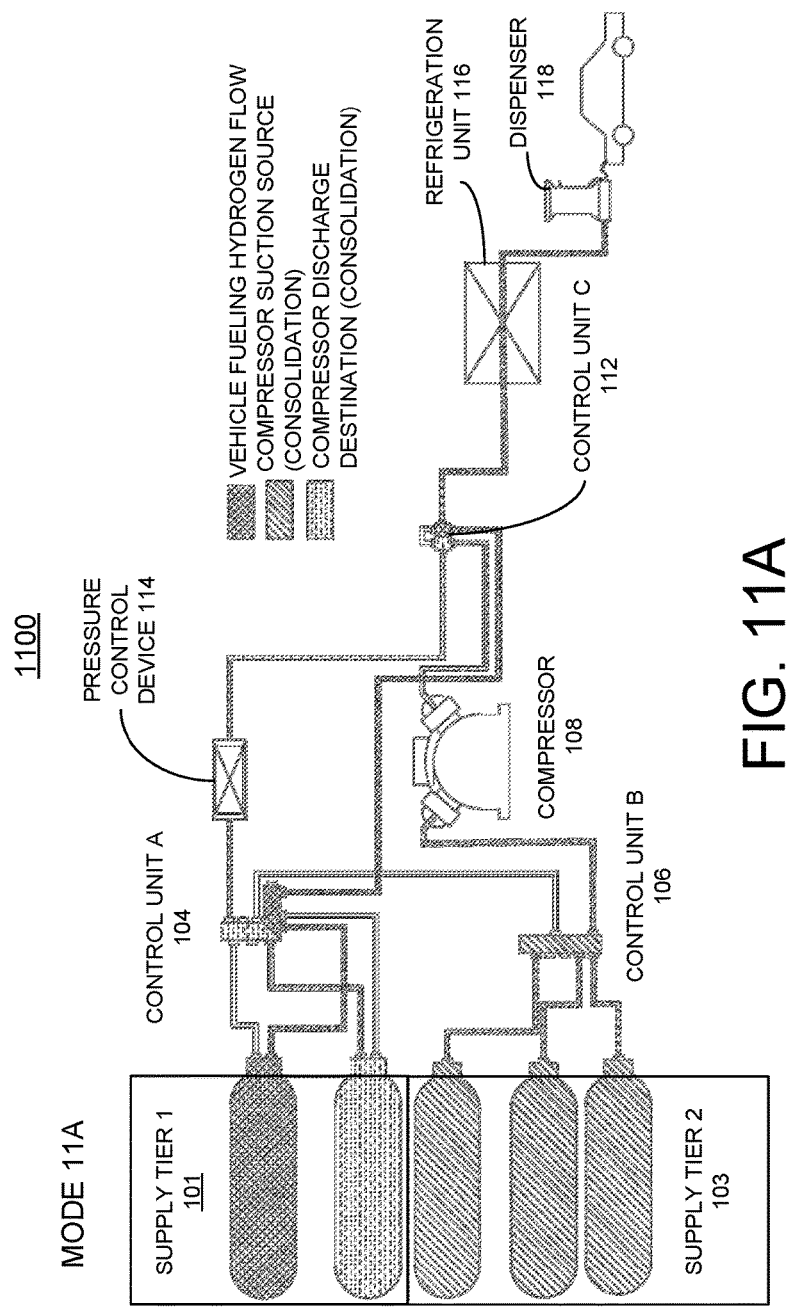
Figure 11B:
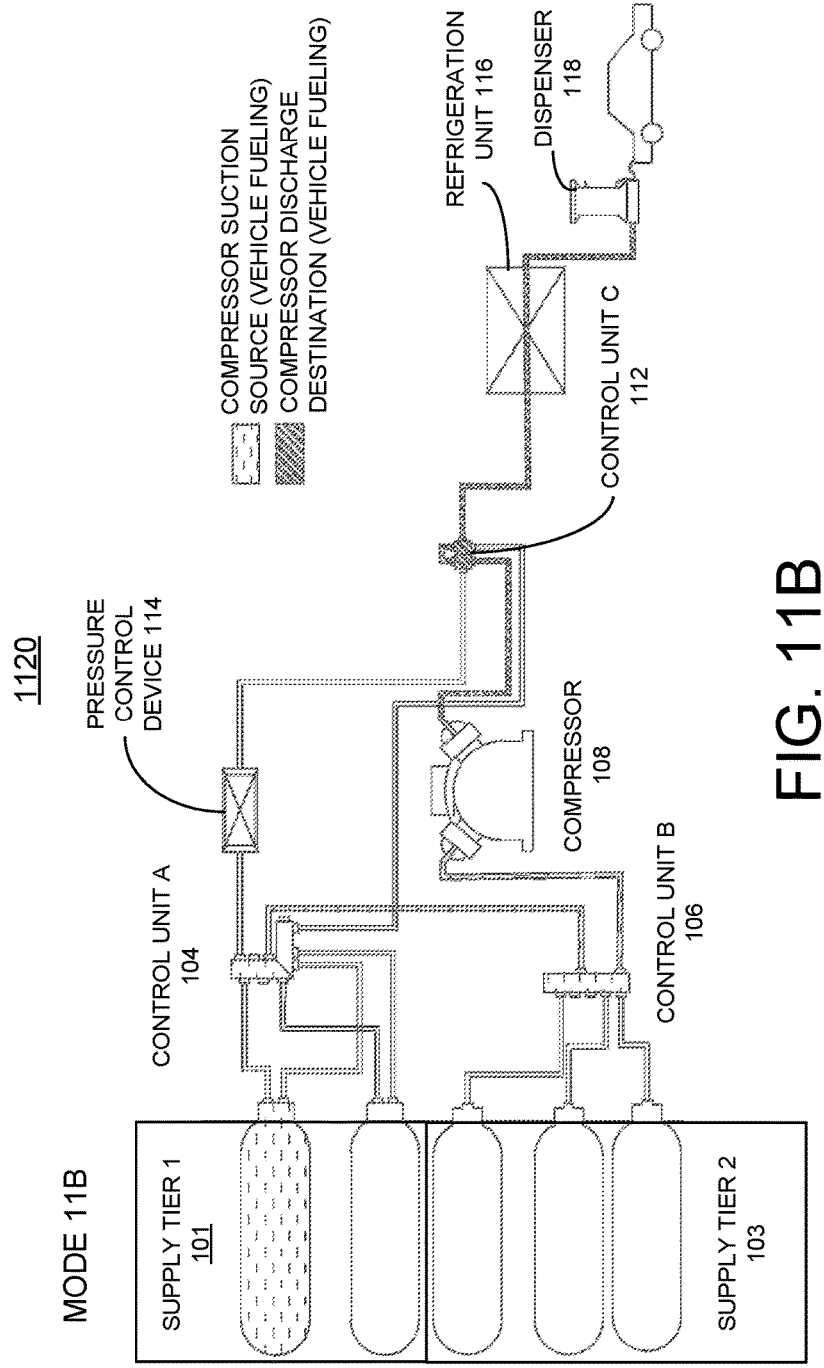
Figure 12:
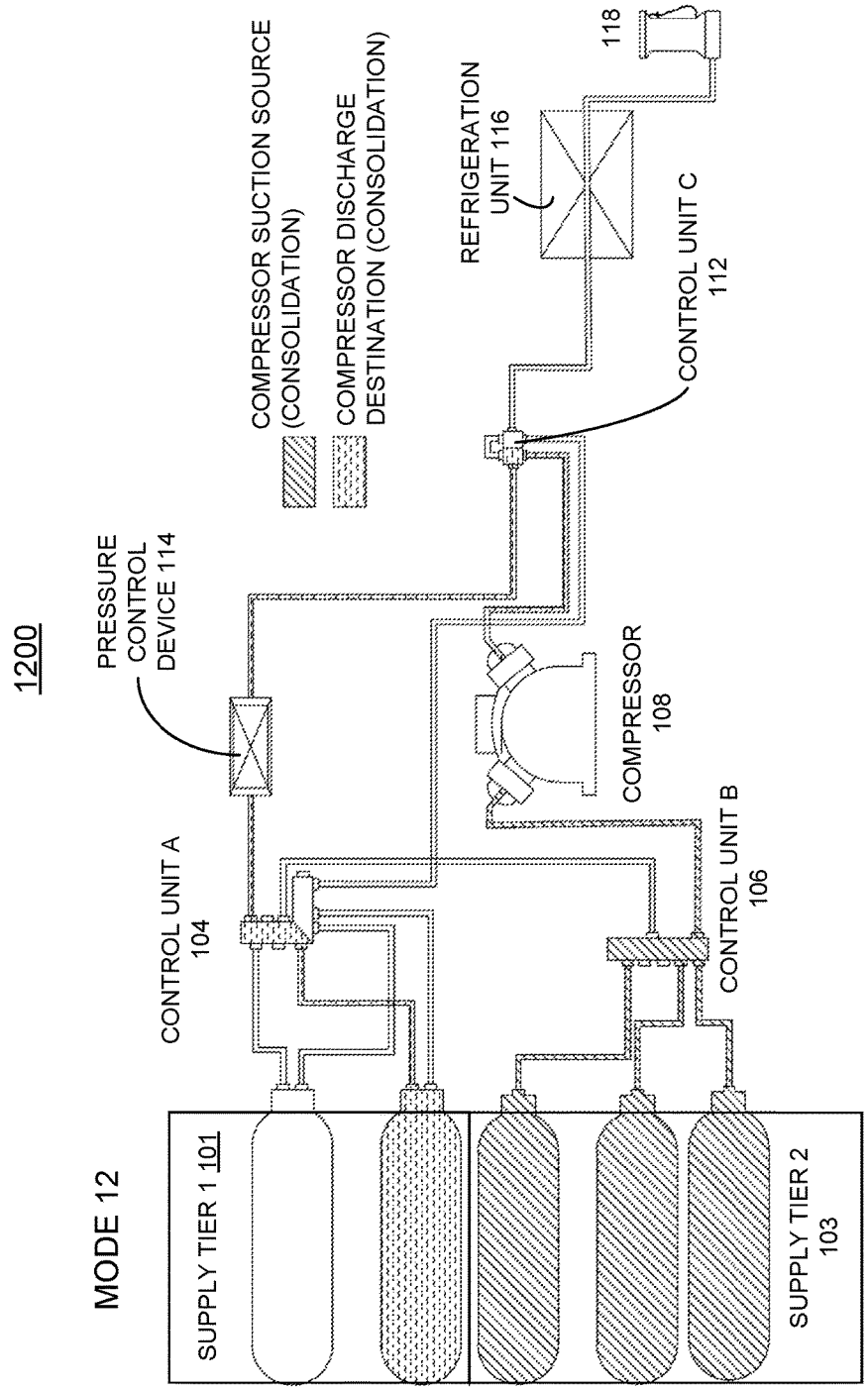

Referring to FIGS. 11A, 11B, and 12, there are shown operational modes with vehicle filling directly via compressor 108 handling one stream of hydrogen (Modes 1100, 1120 and 1200).

In FIGS. 11A, 11B, and 12, when a compressor 108 is configured to only handle one stream of hydrogen, the operation of the refueling station without the high pressure buffer storage 110 can be represented in modes 1100, 1120 and 1200. In such a scenario the compressor 108 can be dedicated to consolidation moving the hydrogen from tier 2, 103 pressure vessels 102 to tier 1, 101 pressure vessel banks 102, or the compressor 108 can be dedicated to filling the vehicle's tank by moving hydrogen from tier 1, 101 pressure vessel banks 102 to the vehicle's tank via the dispenser 118. During each of these modes, the following Tasks 4 (Vehicle fueling) and 5 (Tube-Trailer Consolidation) are carried out whenever and wherever possible.

Task 4 (Vehicle Fueling):

(a) H2 or gaseous fuel is directly drawn from the pressure vessel bank 102 with the highest pressure in Tier 1, 101 (i.e., bypassing compressor 208) to fill the vehicle's tank. This sub-task ends when the mass flow rate between the pressure vessel bank and the vehicle's tank reaches a predefined lower limit or until the pressure at the dispenser 118 cannot sustain a necessary flow required for vehicle fueling.

(b) H2 or gaseous fuel is directly drawn from the pressure vessel bank 102 with the highest pressure in Tier 1, 101 by the compressor 108 to fill the vehicle's tank. This task ends when the vehicle reaches its maximum possible state of charge.

Task 5 (Tube-Trailer Consolidation):

An inactive pressure vessel bank 102 with the highest pressure in tier 1, 101 of the tube-trailer is filled (consolidated) from the pressure vessels 102 in the tier 2, 103 through the compressor 108. If the pressure in the destination pressure vessel bank 102 (tier 1, 101 pressure vessel bank) reaches the rated maximum pressure, the next highest pressure vessel bank 102 in tier 1, 101 is selected to be filled from tier 2, 103 (consolidated). This continues until consolidation is complete (i.e., all pressure vessel banks 102 in Tier 1, 101, except the one being drawn from, are either at rated maximum pressure or all pressure vessels 102 in Tier 2, 103, are at their specified return pressure), or until there is a change of state.

In FIGS. 11A, 11B, the operational modes 11A, 1100, and 11B 1120 include Complete Task 4 (a) and Task 5, followed by Task 4 (b).

In FIG. 12, the operational mode 12, 1200 includes Complete Task 5.

Referring to FIGS. 13A, 13B, 14, and 15, there are shown operational modes with vehicle filling via compressor that have two stages, each capable of independently handling a separate stream (Modes 13A, 1300, 13B, 1320, 14, 1400 and 15, 1500).

In FIGS. 13A, 13B, 14, and 15, when the two stages 1, 502, and 2, 504 of a multi-stage compressor 118 are configured to work independently (i.e., each stage can independently handle a separate stream) similar to the operation of two separate single-stage compressors, the operation of the refueling station with no high pressure buffer storage can be represented in modes 13A, 1300, 13B, 1320, 14, 1400 and 15, 1500. In such a scenario one stage 1, 502, of the compressor can be dedicated to consolidation moving the hydrogen from tier 2, 103 pressure vessel banks 102 to tier 1, 101 pressure vessel banks 102; while simultaneously the other stage 2, 504 of the compressor can be dedicated to filling the vehicle's tank by moving hydrogen from tier 1, 101 pressure vessel banks 102 to the vehicle's tank via the dispenser 118. During each of these modes, the following Tasks 6 (Vehicle fueling) and 7 (Tube-Trailer Consolidation) are carried out whenever and wherever possible.

Task 6 (Vehicle Fueling):

(a) H2 or gaseous fuel is directly drawn from the pressure vessel bank 102 with the highest pressure in tier 1, 101 (i.e., bypassing compressor) to fill the vehicle's tank. This sub-task ends when the mass flow rate between the pressure vessel bank 102 and the vehicle's tank reaches a predefined lower limit or until the pressure at the dispenser 118 cannot sustain a necessary flow required for vehicle fueling.

(b) H2 or gaseous fuel is directly drawn from the pressure vessel bank 102 with the highest pressure in tier 1, 101 by the compressor's stage 2, 504 to fill the vehicle's tank. This task ends when the vehicle reaches its maximum possible state of charge.

(c) Tier 2, 103 pressure vessel banks 102 are at their minimum specified operating pressure. H2 or gaseous fuel is directly drawn from the pressure vessel bank 102 with the highest pressure in tier 1, 101 by the compressor's stage 1, 502 which directly feeds the compressor's stage 2, 504, in a combined operation to fill the vehicle's tank. This task ends when the vehicle reaches its maximum possible state of charge.

Task 7 (Tube-Trailer Consolidation):

The inactive pressure vessel bank 102 with the highest pressure in tier 1, 101 of the tube-trailer is filled (consolidated) from the pressure vessels 102 in the tier 2, 103 through stage 1, 502 of the compressor. If the pressure in the destination pressure vessel bank 102 (tier 1, 101 pressure vessel bank 102) reaches the rated maximum pressure, the next highest pressure vessel bank 102 in tier 1, 102 is selected to be filled from tier 2, 103 (consolidated). This continues until consolidation is complete (i.e., all pressure vessel banks 102 in tier 1, 101, except the one being drawn from, are either at rated maximum pressure or all pressure vessels 102 in tier 2, are at their specified return pressure).

Figure 13A:
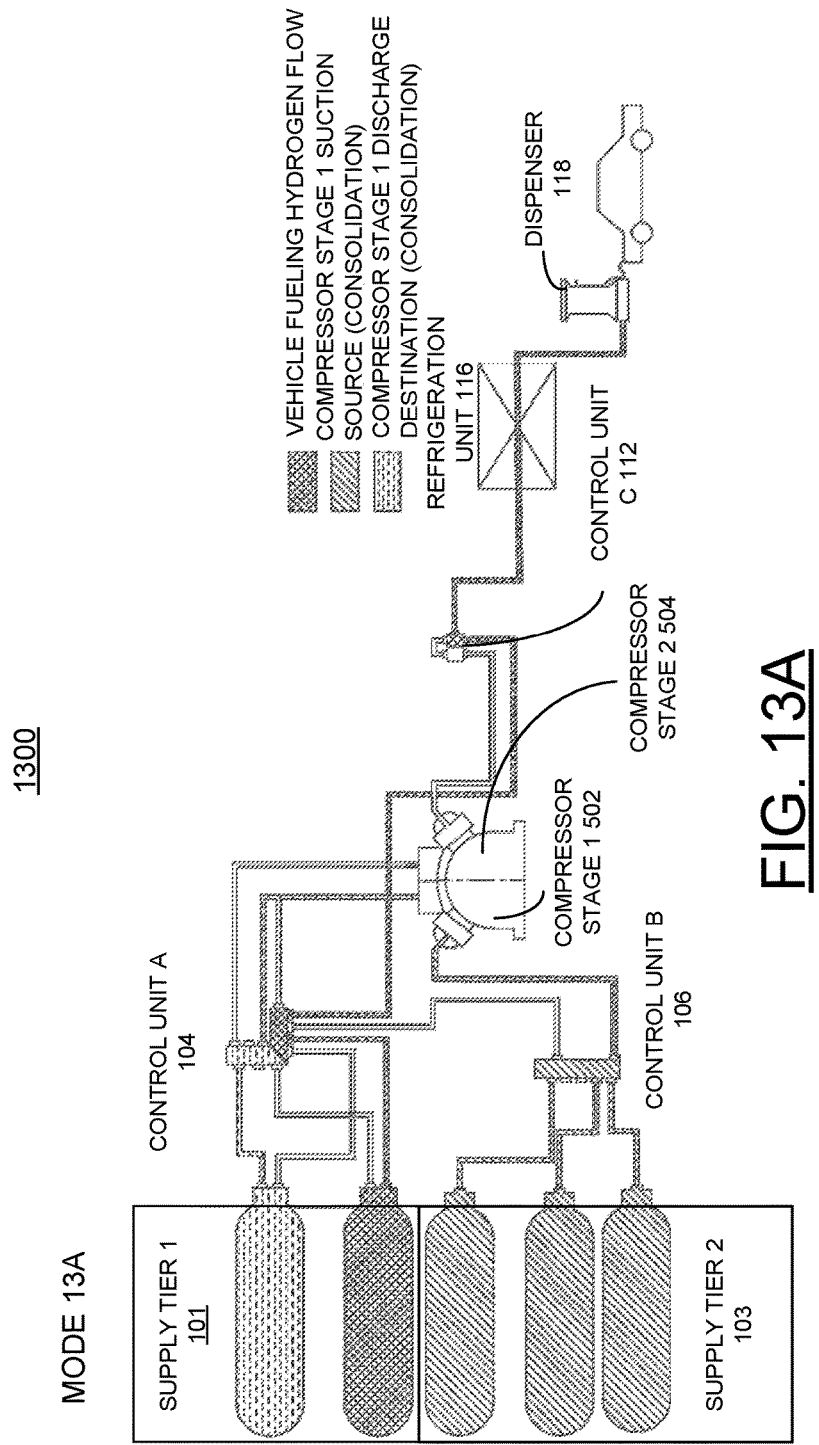
Figure 13B:
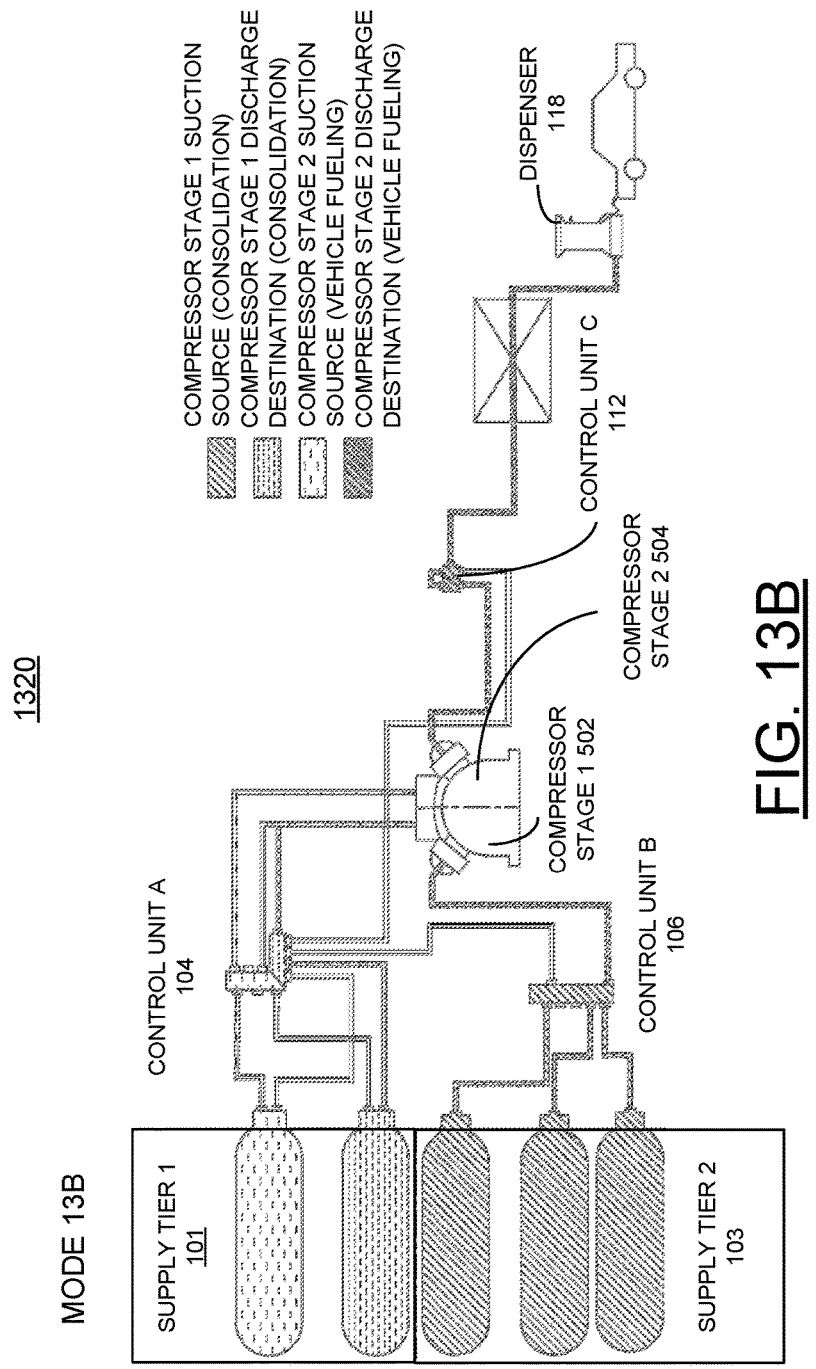

In FIGS. 13A, 13B, the operational modes 13A, 1300, and 13B 1320 include Complete Task 6 (a) and Task 7, followed by Task 6 (b) and Task 7.

Figure 14:
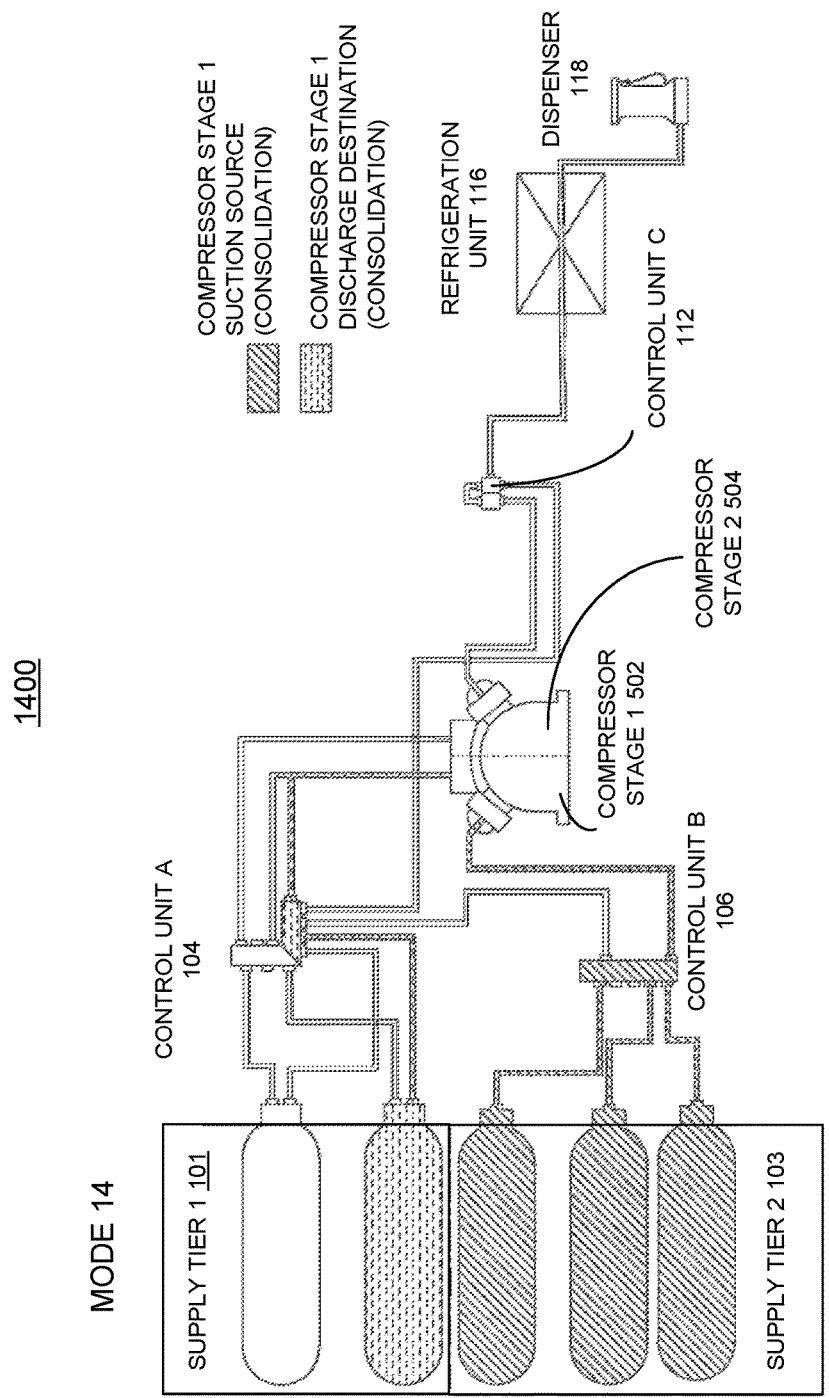

In FIG. 14, the operational mode 14, 1400 includes Complete Task 7.

Figure 15:
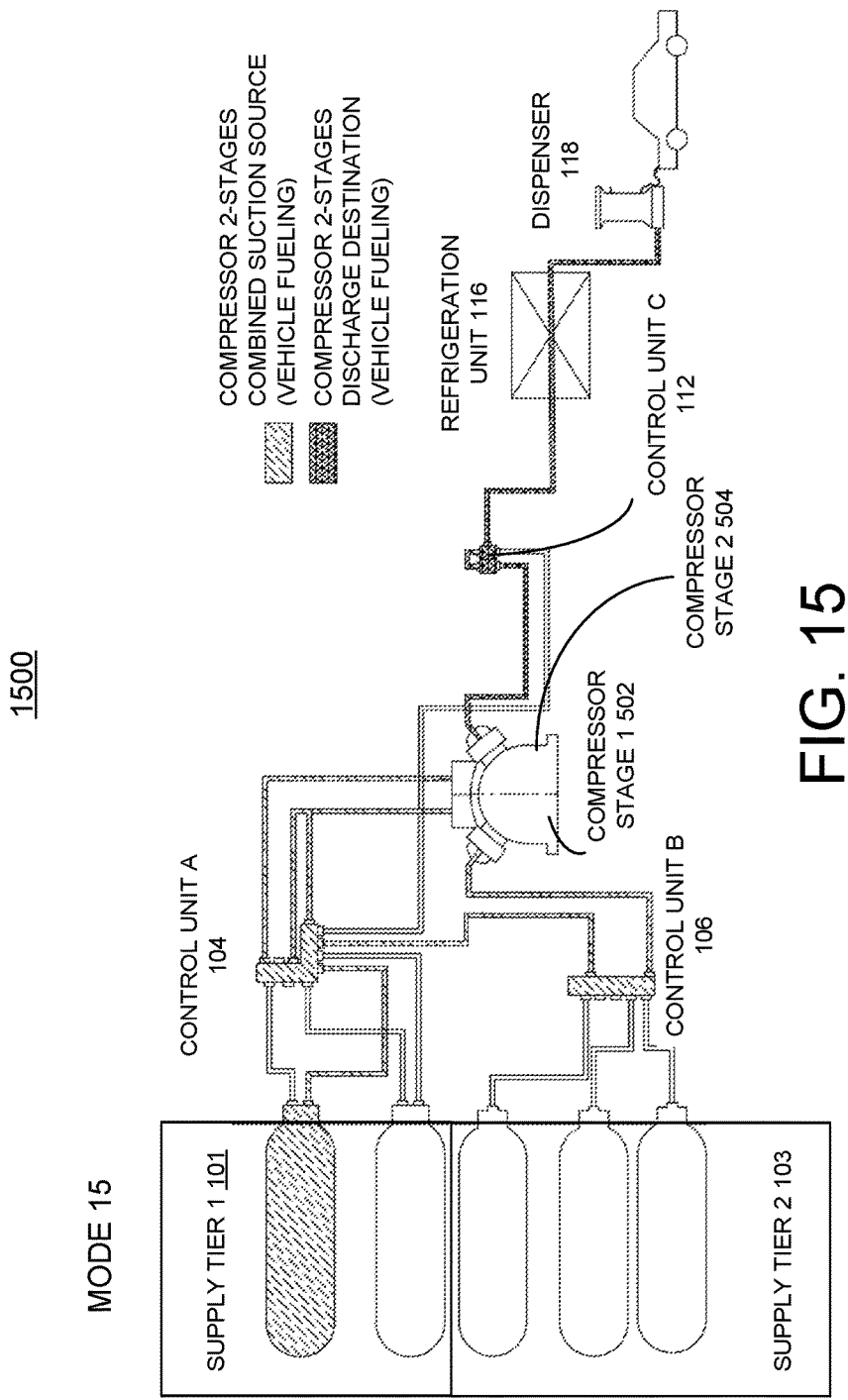

In FIG. 15, the operational mode 15, 1500 includes Complete Task 6 (c).

In modes 1A, 1B, 2A, 2B, 3, 4, 11A, 11B and 12, the compressor 108 refers to a compressor handling one stream of hydrogen. In modes 5A, 5B, 6A, 6B, 7A, 7B, 8, 9, 10, 13A, 13B, 14, and 15, stage 1, 502 or stage 2, 504 refers to a compressor 108 where each stage can consist of multiple stages working together (for example in a 4 stage compressor, where first and second stages can be combined to represent stage 1, 502 and the third and fourth stages can be combined to represent stage 2, 504. Such stage 1, 502 and stage 2, 504 are independently capable of handling a separate stream.

Referring to FIG. 16, there are shown example steps generally designated by reference character 1600 for operating refueling station tube-trailers and compressors to reduce hydrogen refueling cost in accordance with preferred embodiments. As indicated at a block 1602, a plurality of pressure vessel banks 102 on a tube-trailer are configured or divided into a first tier 1, 101, and a second tier 2, 103, each tier including at least one pressure vessel bank with a separate control unit A, 104, and B, 106. Each control unit A, 104, and B, 106 is coupled to a compressor 10. A high pressure buffer storage 110 optionally is coupled by a separate control unit C, 112 to the compressor 108, as described above.

As indicated at a block 1604, monitoring pressure in each tier 1, 101, and tier 2, 103 including each pressure vessel bank 102 in the tier 1, 101, and tier 2, 103 and selectively using one of the tier 1, 101, the tier 2, 103, and the high pressure buffer storage 110 to refuel vehicles based upon the monitored pressures is performed as described above.

As indicated at a block 1606, selectively consolidating hydrogen (or other gaseous fuel) between the tier 1, 101, the tier 2, 103, and the high pressure buffer storage 110 based upon the monitored pressures is performed as described above.

While the present invention has been described with reference to the details of the embodiments of the invention shown in the drawing, these details are not intended to limit the scope of the invention as claimed in the appended claims.

What is claimed is:

1. A system for operating refueling station tube-trailers and compressors to reduce hydrogen refueling cost comprising:
   a hydrogen refueling station includes a two-tier fuel supply of pressure vessels on a refueling station tube-trailer, with a first tier and a second tier of pressure vessels including at least one or more pressure vessels connected together;
   a compressor;
   a separate control unit coupled to the first tier and the second tier of pressure vessels with each of the control units coupled to said compressor;
   a high pressure buffer storage coupled to said compressor by a separate control unit; and
   said separate control units monitoring pressure in the each tier; and based upon monitored pressures selectively consolidating hydrogen between said first tier of pressure vessels, said second tier pressure vessels, and said high pressure buffer storage including filling a destination pressure vessel bank having a highest pressure until reaching a rated maximum pressure, filling a next highest destination pressure vessel bank until reaching a rated maximum pressure, and continuing until consolidation is complete, and using a selected one of said first tier of pressure vessels, said second tier pressure vessels, and said high pressure buffer storage to refuel vehicles drawn directly from a pressure vessel bank from a selected tier or a high pressure buffer storage until a predefined limit of a vehicle tank is reached while a necessary vehicle fueling flow is sustained.

2. The system as recited in claim 1 wherein said separate control units monitoring pressure in the each tier includes based upon a first predefined pressure in the first tier, said separate control units using the first tier to refuel vehicles.

3. The system as recited in claim 2 includes said separate control units responsive to a second predefined pressure in the first tier and based upon the first predefined pressure in the second tier, using said high pressure buffer storage to refuel vehicles.

4. The system as recited in claim 3 includes said separate control units consolidating hydrogen between from said second tier of pressure vessels into said first tier of pressure vessels.

5. The system as recited in claim 1 wherein said compressor includes a single stage.

6. The system as recited in claim 1 wherein said compressor includes a first stage and a second stage, and said first stage and said second stage are independently capable of handling a separate hydrogen stream.

7. The system as recited in claim 1 wherein said separate control units consolidate hydrogen from the second tier of pressure vessel banks into first tier pressure vessel banks when a second stage of said compressor is effectively idle and said high pressure buffer storage is full.

8. The apparatus as recited in claim 1 wherein said two-tier fuel supply of pressure vessels is configured to limit the number of pressure vessels subjected to possible pressure cycling during station operation.

9. The system as recited in claim 1 wherein said two-tier fuel supply of pressure vessels is configured to reduce the number of fittings and simplify controls, further reducing the refueling costs.

10. The system as recited in claim 1 wherein said two-tier fuel supply of pressure vessels is configured to effectively and efficiently serve multiple users further reducing the refueling costs.

11. The system as recited in claim 1 wherein said separate control units implement selected predefined operational modes responsive to said monitored pressures.

12. The apparatus as recited in claim 1 includes a dispenser connected to a vehicle for refueling, and wherein said separate control units implement predefined operational modes responsive to said dispenser being connected to said vehicle.

13. The apparatus as recited in claim 1 wherein said separate control units implement predefined operational modes for consolidating hydrogen from the second tier of pressure vessels into the first tier of pressure vessels responsive to said monitored pressures when a second stage of said compressor is effectively idle and said high pressure buffer storage is full.

14. A method for operating refueling station tube-trailers and compressors to reduce hydrogen refueling cost comprising:
   providing a hydrogen refueling station including a two-tier fuel supply of pressure vessels on a refueling station tube-trailer, with a first tier and a second tier of pressure vessels, each said tier including at least one or more pressure vessels connected together;
   coupling a separate control unit to each of said first tier and said second tier of pressure vessels;
   coupling a compressor to said first tier and said second tier of pressure vessels;
   providing a high pressure buffer storage coupled to said compressor by another separate control unit;
   said separate control units, monitoring pressure in the each tier and said high pressure buffer storage and based upon said monitored pressure, selectively using a selected one of said first tier of pressure vessels, said second tier pressure vessels, and said high pressure buffer storage to refuel vehicles drawn directly from a pressure vessel bank from a selected tier or a high pressure buffer storage until a predefined limit of a vehicle tank is reached while a necessary vehicle fueling flow is sustained.

15. The method as recited in claim 14 includes said separate control units selectively consolidating hydrogen between said first tier of pressure vessels, said second tier pressure vessel, and said high pressure buffer based upon monitored pressures including filling a destination pressure vessel bank having a highest pressure until reaching a rated maximum pressure, filling a next highest destination pressure vessel bank until reaching a rated maximum pressure, and continuing until consolidation is complete.

16. The method as recited in claim 15 includes said separate control units consolidating hydrogen from said second tier of pressure vessel into said first tier pressure vessel banks when a second stage of said compressor is effectively idle and said high pressure buffer storage is full.

17. The method as recited in claim 14 wherein said separate control units, monitoring pressure in the each tier and said high pressure buffer storage includes said separate control units monitoring pressure in each said pressure vessel in said first tier of pressure vessels and said second tier of pressure vessels.

18. The method as recited in claim 14 includes said separate control units based upon a first predefined pressure in the first tier, using said first tier to refuel vehicles.

19. The method as recited in claim 18 includes said separate control units responsive to a second predefined pressure in said first tier, using said high pressure buffer storage to refuel vehicles.

20. The method as recited in claim 14 wherein providing said compressor includes providing said compressor with a first stage and a second stage, and both said first stage and said second stage independently capable of handling a separate hydrogen stream.

* * * * *